(12) United States Patent
Becker et al.

(10) Patent No.: US 8,656,503 B2
(45) Date of Patent: Feb. 18, 2014

(54) SECURITY LANGUAGE TRANSLATIONS WITH LOGIC RESOLUTION

(75) Inventors: Moritz Y. Becker, Cambridge (GB);
Blair B. Dillaway, Redmond, WA (US);
Cedric Fournet, Cambridge (GB);
Andrew D. Gordon, Cambridge (GB);
Jason F. Mackay, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1387 days.

(21) Appl. No.: 11/530,556

(22) Filed: Sep. 11, 2006

(65) Prior Publication Data

US 2008/0066171 A1 Mar. 13, 2008

(51) Int. Cl.
*G06F 7/04* (2006.01)

(52) U.S. Cl.
USPC .......................................................... 726/27

(58) Field of Classification Search
USPC ..................................................... 726/27, 28
See application file for complete search history.

(56) References Cited

U.S. PATENT DOCUMENTS

| | | | |
|---|---|---|---|
| 4,868,877 A | 9/1989 | Fischer | |
| 5,214,702 A | 5/1993 | Fischer | |
| 5,649,099 A | 7/1997 | Theimer et al. | |
| 5,765,153 A | 6/1998 | Benantar et al. | |
| 6,189,103 B1 | 2/2001 | Nevarez et al. | |
| 6,216,231 B1 | 4/2001 | Stubblebine | |
| 6,256,734 B1 | 7/2001 | Blaze et al. | |
| 6,256,741 B1 | 7/2001 | Stubblebine | |
| 6,367,009 B1 | 4/2002 | Davis et al. | |
| 6,484,261 B1 | 11/2002 | Wiegel | |
| 6,779,120 B1 | 8/2004 | Valente et al. | |
| 6,895,503 B2 | 5/2005 | Tadayon et al. | |
| 6,931,530 B2 | 8/2005 | Pham et al. | |
| 6,976,009 B2 | 12/2005 | Tadayon et al. | |
| 7,085,741 B2 | 8/2006 | Lao et al. | |
| 7,127,605 B1 | 10/2006 | Montgomery et al. | |
| 7,162,633 B2 | 1/2007 | Wang et al. | |
| 7,260,715 B1 | 8/2007 | Pasieka | |
| 7,290,138 B2 | 10/2007 | Freeman et al. | |
| 7,426,635 B1 | 9/2008 | Parkhill et al. | |
| 7,437,421 B2 | 10/2008 | Bhogal et al. | |

(Continued)

FOREIGN PATENT DOCUMENTS

| JP | 2000235497 A | 8/2000 |
|---|---|---|
| JP | 2001184264 A | 7/2001 |

(Continued)

OTHER PUBLICATIONS

Office Action from the U.S. Patent and Trademark Office for U.S. Appl. No. 11/530,433, mailed Mar. 1, 2009, 26 pages.

(Continued)

*Primary Examiner* — Philip Chea
*Assistant Examiner* — Daniel Hoang
(74) *Attorney, Agent, or Firm* — Lee & Hayes, PLLC

(57) ABSTRACT

Security language constructs may be translated into logic language constructs and vise versa. Logic resolution may be effected using, for example, the logic language constructs. In an example implementation, translation of a security language assertion into at least one logic language rule is described. In another example implementation, translation of a proof graph reflecting a logic language into a proof graph reflecting a security language is described. In yet another example implementation, evaluation of a logic language program using a deterministic algorithm is described.

6 Claims, 14 Drawing Sheets

(56) References Cited

U.S. PATENT DOCUMENTS

| | | | |
|---|---|---|---|
| 7,506,364 B2 | 3/2009 | Vayman | |
| 7,509,489 B2 | 3/2009 | Kostal et al. | |
| 7,512,782 B2 | 3/2009 | Kaler et al. | |
| 7,533,265 B2 | 5/2009 | Ballinger et al. | |
| 7,543,140 B2 | 6/2009 | Dillaway et al. | |
| 7,644,284 B1 | 1/2010 | Stubblebine | |
| 7,814,534 B2 | 10/2010 | Dillaway | |
| 7,823,192 B1 | 10/2010 | Fultz et al. | |
| 7,844,610 B2 | 11/2010 | Hillis et al. | |
| 8,060,931 B2 | 11/2011 | Dillaway et al. | |
| 2001/0018675 A1 | 8/2001 | Blaze et al. | |
| 2002/0087859 A1* | 7/2002 | Weeks et al. | 713/156 |
| 2002/0109707 A1 | 8/2002 | Lao et al. | |
| 2002/0129135 A1 | 9/2002 | Delany et al. | |
| 2002/0184160 A1 | 12/2002 | Tadayon et al. | |
| 2002/0184517 A1 | 12/2002 | Tadayon et al. | |
| 2003/0083877 A1 | 5/2003 | Sugimoto | |
| 2003/0110192 A1 | 6/2003 | Valente et al. | |
| 2003/0115292 A1 | 6/2003 | Griffin et al. | |
| 2003/0120955 A1 | 6/2003 | Bartal et al. | |
| 2003/0149714 A1 | 8/2003 | Casati et al. | |
| 2003/0225697 A1 | 12/2003 | DeTreville | |
| 2003/0229781 A1 | 12/2003 | Fox et al. | |
| 2004/0024764 A1 | 2/2004 | Hsu et al. | |
| 2004/0034770 A1 | 2/2004 | Kaler et al. | |
| 2004/0034774 A1 | 2/2004 | Le Saint | |
| 2004/0064707 A1 | 4/2004 | McCann et al. | |
| 2004/0068757 A1 | 4/2004 | Heredia | |
| 2004/0122958 A1 | 6/2004 | Wardrop | |
| 2004/0123154 A1 | 6/2004 | Lippman et al. | |
| 2004/0128393 A1 | 7/2004 | Blakley, III et al. | |
| 2004/0128546 A1 | 7/2004 | Blakley, III et al. | |
| 2004/0139352 A1 | 7/2004 | Shewchuk et al. | |
| 2004/0162985 A1 | 8/2004 | Freeman et al. | |
| 2004/0181665 A1 | 9/2004 | Houser | |
| 2004/0210756 A1 | 10/2004 | Mowers et al. | |
| 2004/0221174 A1 | 11/2004 | Le Saint et al. | |
| 2004/0243811 A1 | 12/2004 | Frisch et al. | |
| 2004/0243835 A1 | 12/2004 | Terzis et al. | |
| 2004/0250112 A1 | 12/2004 | Valente et al. | |
| 2005/0015586 A1 | 1/2005 | Brickell | |
| 2005/0033813 A1 | 2/2005 | Bhogal et al. | |
| 2005/0055363 A1 | 3/2005 | Mather | |
| 2005/0066198 A1 | 3/2005 | Gelme et al. | |
| 2005/0071280 A1 | 3/2005 | Irwin et al. | |
| 2005/0079866 A1 | 4/2005 | Chen et al. | |
| 2005/0080766 A1 | 4/2005 | Ghatare | |
| 2005/0097060 A1 | 5/2005 | Lee et al. | |
| 2005/0108176 A1 | 5/2005 | Jarol et al. | |
| 2005/0132220 A1 | 6/2005 | Chang et al. | |
| 2005/0138357 A1 | 6/2005 | Swenson et al. | |
| 2005/0187877 A1 | 8/2005 | Tadayon et al. | |
| 2005/0188072 A1 | 8/2005 | Lee et al. | |
| 2005/0198326 A1 | 9/2005 | Schlimmer et al. | |
| 2005/0220304 A1 | 10/2005 | Lenoir et al. | |
| 2006/0005010 A1 | 1/2006 | Olsen et al. | |
| 2006/0005227 A1 | 1/2006 | Samuelsson et al. | |
| 2006/0015728 A1 | 1/2006 | Ballinger et al. | |
| 2006/0026667 A1 | 2/2006 | Bhide et al. | |
| 2006/0041421 A1 | 2/2006 | Ta et al. | |
| 2006/0041929 A1 | 2/2006 | Della-Libera et al. | |
| 2006/0048216 A1 | 3/2006 | Hinton et al. | |
| 2006/0075469 A1 | 4/2006 | Vayman | |
| 2006/0101521 A1 | 5/2006 | Rabinovitch | |
| 2006/0106856 A1 | 5/2006 | Bermender et al. | |
| 2006/0129817 A1 | 6/2006 | Borneman et al. | |
| 2006/0136990 A1 | 6/2006 | Hinton et al. | |
| 2006/0156391 A1 | 7/2006 | Salowey | |
| 2006/0195690 A1 | 8/2006 | Kostal et al. | |
| 2006/0200664 A1 | 9/2006 | Whitehead et al. | |
| 2006/0206707 A1 | 9/2006 | Kostal et al. | |
| 2006/0206925 A1 | 9/2006 | Dillaway et al. | |
| 2006/0206931 A1 | 9/2006 | Dillaway et al. | |
| 2006/0225055 A1 | 10/2006 | Tieu | |
| 2006/0230432 A1 | 10/2006 | Lee et al. | |
| 2006/0236382 A1 | 10/2006 | Hinton et al. | |
| 2006/0242075 A1 | 10/2006 | Ginter et al. | |
| 2006/0242162 A1 | 10/2006 | Conner et al. | |
| 2006/0242688 A1 | 10/2006 | Paramasivam et al. | |
| 2006/0259776 A1 | 11/2006 | Johnson et al. | |
| 2007/0006284 A1 | 1/2007 | Adams et al. | |
| 2007/0043607 A1 | 2/2007 | Howard et al. | |
| 2007/0055887 A1 | 3/2007 | Cross et al. | |
| 2007/0056019 A1 | 3/2007 | Allen et al. | |
| 2007/0061872 A1 | 3/2007 | Carter | |
| 2007/0143835 A1 | 6/2007 | Cameron et al. | |
| 2007/0169172 A1 | 7/2007 | Backes et al. | |
| 2007/0199059 A1 | 8/2007 | Takehi | |
| 2007/0283411 A1 | 12/2007 | Paramasivam et al. | |
| 2007/0300285 A1 | 12/2007 | Fee et al. | |
| 2008/0066158 A1 | 3/2008 | Dillaway et al. | |
| 2008/0066159 A1 | 3/2008 | Dillaway et al. | |
| 2008/0066160 A1 | 3/2008 | Becker et al. | |
| 2008/0066169 A1 | 3/2008 | Dillaway et al. | |
| 2008/0066175 A1 | 3/2008 | Dillaway et al. | |
| 2008/0097748 A1 | 4/2008 | Haley et al. | |
| 2008/0127320 A1 | 5/2008 | De Lutiis et al. | |
| 2008/0172721 A1 | 7/2008 | Noh et al. | |
| 2009/0126022 A1 | 5/2009 | Sakaki | |

FOREIGN PATENT DOCUMENTS

| | | |
|---|---|---|
| JP | 2002163235 A | 6/2002 |
| JP | 2004206187 A | 7/2004 |
| JP | 2005141746 A | 6/2005 |
| JP | 2005309780 A | 11/2005 |
| JP | 2005332049 A | 12/2005 |
| JP | 2006221506 A | 8/2006 |
| WO | WO0056027 | 9/2000 |
| WO | WO2006116103 A2 | 11/2006 |
| WO | WO2008030876 | 3/2008 |
| WO | WO2008031043 | 3/2008 |

OTHER PUBLICATIONS

Office Action from the U.S. Patent and Trademark Office for U.S. Appl. No. 11/530,429, mailed on Mar. 2, 2010, 21 pages.

Office Action from the U.S. Patent and Trademark Office for U.S. Appl. No. 11/530,427, mailed Mar. 3, 2010, 26 pages.

Office Action from the U.S. Patent and Trademark Office for U.S. Appl. No. 11/530,446, mailed on Feb. 24, 2010, 30 pages.

Office Action from the U.S. Patent and Trademark Office for U.S. Appl. No. 11/530,439, mailed on Mar. 5, 2010, 32 pages.

Office Action from the U.S. Patent and Trademark Office for U.S. Appl. No. 11/530,438, mailed May 20, 2010, 35 pages.

Office Action from the U.S. Patent and Trademark Office for U.S. Appl. No. 11/530,427, mailed on Aug. 20, 2010, 23 pages.

Office Action from the U.S. Patent and Trademark Office for U.S. Appl. No. 11/530,429, mailed on Aug. 20, 2009, 24 pages.

Office Action from the U.S. Patent and Trademark Office for U.S. Appl. No. 11/530,433, mailed on Aug. 21, 2009, 24 pages.

Hallam-Baker et al., "Web Services Security: SAML Token Profile", OASIS Open, Sep. 23, 2002, pp. 1-25.

Keoh et al., "Towards Flexible Credential Verification in Mobile Ad-hoc Networks", ACM 2002, POMC '02, Oct. 30-31, 2002, pp. 58-65

Dai et al., "Logic Based Authorization Policy Engineering", 2001, pp. 1-9.

Office Action from the U.S. Patent and Trademark Office for U.S. Appl. No. 11/530,438, mailed Oct. 29, 2010, 31 pages.

Office Action from the U.S. Patent and Trademark Office for U.S. Appl. No. 11/530,564, mailed on Sep. 15, 2010, 17 pages.

Notice of Allowance from the U.S. Patent and Trademark Office for U.S. Appl. No. 11/530,439, mailed Aug. 23, 2010, 22 pages.

Pfenning et al., "System Description: Twelf—A Meta-Logical Framework for Deductive Systems", 1999, pp. 1-5.

Whitehead et al., "By Reason and Authority: A System for Authorization of Proof-Carrying Code", IEEE Computer Secuirty Foundations Workshop (CSFW'04) 2004, pp. 1-15.

Advisory Action for U.S. Appl. No. 11/530,427, mailed on Sep. 26, 2011, Blair B. Dillaway, "Variable Expressions in Security Assertions".

(56) References Cited

OTHER PUBLICATIONS

Advisory Action for U.S. Appl. No. 11/530,433, mailed on Sep. 27, 2011, Blair B. Dillaway, "Fact Qualifiers in Security Scenarios".
Abadi, "Logic in Access Control", Proceedings 18th Annual IEEE Symposium on Logic in Computer Science, Jun. 22-25, 2003, Ottawa, Ontario, Canada, pp. 228-233.
Becker, et al., "SecPAL: Design and Semantics of a Decentralized Authorization Language—Technical Report MSR-TR-2006-120", Sep. 1, 2006, Microsoft Research, Cambridge, UK, retrieved from the Internet at http://courses.cs.vt.edu/cs5204/fall10-kafura-NVC/Papers/Security/SecPal-Reference.pdf on Dec. 21, 2011.
Chen, et al., "Tabled Evaluations with Delaying for General Logic Programs", Journal of the ACM, vol. 43, No. 1, Jan. 1996, pp. 20-74.
The Chinese Office Action mailed Jan. 30, 2012 for Chinese patent application No. 2011101621104, a counterpart foreign application of US patent No. 8,060,931, 6 pages.
The European Office Action mailed Dec. 22, 2011 for European patent application No. 07841896.9, a counterpart foreign application of US patent No. 8,060,931, 4 pages.
The Extended European Search Report mailed Jan. 18, 2012 for European patent application No. 07842186.4, 9 pages.
Geuer-Pollmann, et al., "Web Services and Web Service Security Standards", Elsevier Advanced Technology Publications, Journal of Information Security Technology Report, Jan. 2005, vol. 10, Issue 1, pp. 15-24.
Haider, et al., "An Extended RBAC Profile of XACML", In the Proceedings of the 3rd ACM Workshop on Secure Web Services, Nov. 2006, pp. 13-22.
Translated Japanese Office Action mailed Jan. 24, 2012 for Japanese patent application No. 2009-527617, a counterpart foreign application of U.S. Appl. No. 11/530,556, 14 pages.
Pimlott, et al., "Soutei, a Logic-Based Trust-Management System", Functional and Logic Programming, 8th International Symposium, FLOPS 2006 Proceedings, LNCS 3945, Apr. 24-26, 2006, pp. 130-145.
Chadwick, "An Authorisation Interface for the GRID", In the Proceedings of the E-Science All Hands Meeting, Nottingham, Sep. 2003, 14 pgs.
Translation and the Chinese Notice of Grant of Patent Right for Invention mailed Mar. 25, 2011 for Chinese Patent Application No. 200780033322.4 a counterpart foreign application for U.S. Appl. No. 11/530,438, 4 pages.
Translation and the Chinese Office Action mailed Jan. 26, 2011 for Chinese Patent Application No. 200780033359.7, a counterpart foreign application for U.S. Appl. No. 11/530,446, 8 pages.
Erdos, et al., "Shibboleth-Architecture", Draft Version 4, Nov. 2001, 39 pgs.
Office Action from the U.S. Patent and Trademark Office for U.S. Appl. No. 11/530,443, mailed Dec. 7, 2010, 16 pgs.
Office Action from the U.S. Patent and Trademark Office for U.S. Appl. No. 11/530,543, mailed on Dec. 27, 2010, 10 pgs.
Lee, et al., "Security Assertion Exchange for the Agent on the Semantic Web", In the Proceedings of the IADIS International Conference WWW/Internet, Madrid, Spain, 2 Volumes, Oct. 6-9, 2004, pp. 302-308 (9 pgs.).
Office Action from the U.S. Patent and Trademark Office for U.S. Appl. No. 11/530,433 mailed on Jan. 18, 2011, 22 pages.
Office Action from the U.S. Patent and Trademark Office for U.S. Appl. No. 11/530,429, mailed on Jan. 19, 2011, 22 pgs.
Office Action from the U.S. Patent and Trademark Office for U.S. Appl. No. 11/530,446 mailed on Feb. 3, 2011, 26 pages.
Office Action from the U.S. Patent and Trademark Office for U.S. Appl. No. 11/530,427, mailed on Dec. 23, 2010, 23 pages.
Notice of Allowance from the U.S. Patent and Trademark Office for U.S. Appl. No. 11/530,438, mailed Apr. 4, 2011, 8 pages.
Office Action from the U.S. Patent and Trademark Office for U.S. Appl. No. 11/530,564 mailed on Apr. 12, 2011, 8 pages.
The Chinese Office Action mailed Apr. 5, 2012 for Chinese patent application No. 200780033359.7, a counterpart foreign application of U.S. Appl. No. 11/530,446, 9 pages.
The European Office Action mailed, 2012 for European patent application No. 07842066.8, a counterpart foreign application of U.S. Appl. No. 11/530,446, 5 pages.
The Israeli Office Action mailed Mar. 19, 2012 for Israel patent application No. 196407, a counterpart foreign application of U.S. Appl. No. 11/530,446, 4 pages.
The Israeli Office Action mailed Mar. 20, 2012 for Israel patent application No. 196524, a counterpart foreign application of U.S. Appl. No. 11/530,556, 1 page.
Office Action for U.S. Appl. No. 11/530,543, mailed on Apr. 16, 2012, Blair B. Dillaway, "Composable Security Policies", 12 pgs.
Non-Final Office Action for U.S. Appl. No. 11/530,443, mailed on May 26, 2011, Blair B. Dillaway, "Security Assertion Revocation".
Final Office Action for U.S. Appl. No. 11/530,427, mailed on Jun. 29, 2011, Blair B. Dillaway, "Variable Expressions in Security Assertions".
Final Office Action for U.S. Appl. No. 11/530,429, mailed on Jul. 8, 2011, Blair B. Dillaway, "Authorization Decisions with Principal Attributes".
Final Office Action for U.S. Appl. No. 11/530,433, mailed on Jul. 8, 2011, Blair B. Dillaway, "Fact Qualifiers in Security Scenarios".
The Israeli Office Action mailed May 6, 2012 for Israeli patent application No. 196408, a counterpart foreign application of US patent No. 8,060,931, 5 pages.
Translated Japanese Office Action mailed Jun. 29, 2012 for Japanese patent application No. 2009-527617, a counterpart foreign application of U.S. Appl. No. 11/530,556, 6 pages.
Becker, et al., "SecPAL: Design and Semantics of a Decentralized Authorization Language—Technical Report MSR-TR-2006-120", Sep. 11, 2006, Microsoft Research, Cambridge, UK, retrieved from the Internet at http://courses.cs.vt.edu/cs5204/fal110-kafura-NVC/Papers/Security/SecPal-Reference.pdf on Dec. 21, 2011.
Chapin, et al., "Risk Assessment in Distributed Authorization", In the Proceedings of the 2005 ACM Workshop on Formal Methods in Security Engineering, FMSE '05, Nov. 2005, pp. 33-41.
Translated Chinese Notice on the Second Office Action mailed Aug. 25, 2011 for Chinese Patent Application No. 200780033359.7, a counterpart foreign application of U.S. Appl. No. 11/530,446, 15 pages.
ContentGuard, "eXtensibe rights Markup Language (XrML) 2.0 Specification Part 1: Primer", Nov. 20, 2001, pp. 1-39.
DeTreville, "Binder, a Logic-Based Security Language", IEEE Computer Society, In the Proceedings of the 2002 IEEE Symposium on Security and Privacy, Mar. 2002, 10 pgs.
The Extended European Search Report mailed Jul. 22, 2011 for European Patent Application No. 07842066.8.
Kagal, et al., "Trust-Based Security in Pervasive Computing Environments", IEEE Computer, Dec. 1, 2001, vol. 34, No. 12, pp. 2-5.
Office Action for U.S. Appl. No. 12/902,892, mailed on Aug. 5, 2011, Blair B. Dillaway, "Auditing Authorization Decisions," 18 pgs.
Non-Final Office Action for U.S. Appl. No. 11/530,446, mailed on Sep. 15, 2011, Blair B. Dillaway, "Controlling the Delegation of Rights", 30 pages.
Upadhyay, et al., "Generic Security Service API Version 2: Java Bindings Update: draft-ietf-kitten-rfc2853bis-01.txt", IETF Standard-Working-Draft, Internet Engineering Task Force, IETF, CH, vol. kitten, No. 1, Jan. 27, 2006, pp. 1-102.
Wainer, et al., "A Fine-Grained, Controllable, User-to-User Delegation Method in RBAC", Proceedings of the Tenth ACM Symposium on Access Control Models and Technologies, SACMAT, Jun. 2005, pp. 59-66.
Yin, et al., "A Rule-based Framework for Role-based Constrained Delegation", Proceedings of the 3rd International Conference on Information Security, INFOSECU, Nov. 2004, pp. 186-191.
The Chinese Office Action mailed Mar. 13, 2013 for Chinese patent application No. 200780033359.7, a counterpart foreign application of US patent No. 8,201,215, 8 pages.
Translated the Japanese Office Action mailed May 31, 2013 for Japanese patent application No. 2009-527586, a counterpart foreign application of US patent No. 8,201,215, 7 pages.
Office action for U.S. Appl. No. 13/246,537, mailed on Feb. 25, 2013, Dillaway et al., "Security Authorization Queries," 11 pages.

(56) References Cited

OTHER PUBLICATIONS

Ozeki et al., "Distributed and Cooperative Information Protection for Interactive Services," Proceedings of the 66th (Heisei 16) National Convention of IPSJ (5), Special trucks (1), (2), (3), (4), and (5), pp. 5-37 to 5-40, Mar. 9, 2004, Japan.
Ozeki et al., "Privacy Enhanced Distributed and Cooperative Mechanism," Proceedings of DBWeb 2003, Information Processing Society of Japan, vol. 2003, No. 18, Nov. 26, 2003, pp. 155-162.
The Chinese Office Action mailed Sep. 13, 2012 for Chinese patent application No. 200780033359.7, a counterpart foreign application of US patent No. 8,201,215, 9 pages.
The Israeli Office Action mailed Aug. 13, 2012 for Israeli patent application No. 196524, a counterpart foreign application of U.S. Appl. No. 11/530,556, 2 pages.
Office action for U.S. Appl. No. 11/530,427, mailed on Oct. 30, 2012, Dillaway et al., "Variable Expressions in Security Assertions," 23 pages.
Office action for U.S. Appl. No. 11/530,564, mailed on Sep. 27, 2012, Becker et al., "Security Language Expressions for Logic Resolution," 14 pages.
Translated the Japanese Office Action mailed Oct. 26, 2012 for Japanese patent application No. 2009-527586, a counterpart foreign application of US patent No. 8,201,215, 7 pages.
Translated the Japanese Office Action mailed Dec. 7, 2012 for Japanese patent application No. 2009-527540, a counterpart foreign application of US patent No. 8,060,931, 4 pages.
Office action for U.S. Appl. No. 11/530,433, mailed on Jan. 17, 2013, Dillaway et al., "Fact Qualifiers in Security Scenarios ", 29 pages.
Office action for U.S. Appl. No. 11/530,429, mailed on Jan. 22, 2013, Dillaway et al., "Authorization Decisions with Principal Attributes ", 23 pages.
PCT Search Report for Patent Application No. PCT/US2007/078081, mailed on Jan. 22, 2008, 10 pgs.
PCT Search Report for Patent Application No. PCT/US2007/077898, mailed on Feb. 5, 2008, 10 pgs.
Cederquist et al., "An Audit Logic for Accountability", IEEE, 2005, pp. 1-10.
Hughs et al., "Security Assertion Markup Language (SAML) 2.0 Technical Overview", OASIS, 2004, pp. 1-36.
Ardagna, et al., "XML-based Access Control Languages ", Universita degli Studi di Milano, Italy, available at <<http://seclab.dti.unimi.it/Papers/RI-3.pdf>>, pp. 1-14.
Becker, et al., "Cassandra: Distributed Access Control Policies with Tunable Expressiveness", IEEE 5th International Workshop on Policies for Distributed Systems and Networks, 2004, pp. 159-168.
Becker, et al., "Cassandra: Flexible Trust Management Applied to Electronic Health Records", IEEE Computer Security Foundations Workshop, 2004, pp. 139-154.
Blaze, et al., "Decentralized Trust Management", IEEE Symposium on Security and Privacy, 1996, pp. 164-173.
Blaze, et al., "The Role of Trust Management in Distributed Systems Security", Secure Internet Programming, 1999, pp. 185-210.
"eXtensible right Markup Language (XrML) 2.0 Specification Part II: Core Schema", ContentGuard, available at <<www.xrml.org>> Nov. 20, 2001, 46 pages.
Damianou, et al., "Ponder: A Language for Specifying Security and Management Policies for Distributed Systems", Imperial College of Science, Technology and Medicine, London, U.K, Oct. 20, 2000, available at <<http://www.doc.ic.ac.uk/~ncd/policies/files/PonderSpec.pdf>>, pp. 1-49.
DeTreville, "Binder, A Logic-Based Security Language", IEEE Symposium on Security and Privacy, 2002, pp. 105-113.
Ellison, et al., "RFC 2693—SPKI Certificate Theory", available at <<http://www.ietf.org/rfc/rfc2693.txt>>, accessed on Sep. 27, 2006, 38 pages.
Halpern, et al., "Using First-Order Logic to Reason About Policies", IEEE Computer Security Foundations Workshop, 2003, available at <<http://arxiv.org/PS_cache/cd/pdf/0601/0601034.pdf>>, pp. 187-201.

Jim, "SD3: A Trust Management System with Certified Evaluation", Proceedings of the 2001 IEEE Symposium on Security and Privacy, 2001, available at <<http://www.research.att.com/~trevor/papers/JimOakland2001.pdf#search=%22%22SD3%3A%20Trust%20Management%20System%20with%20Certified%20Evaluation%22%22>>, pp. 106-115.
Li, et al., "A Practically Implementable and Tractable Delegation Logic", IEEE Symposium on Security and Privacy, 2000, available at <<http://www.cs.purdue.edu/homes/nlnghul/papers/dl_oakland00.pdf>>, pp. 27-42.
Li, et al., "Datalog with Constraints: A Foundation For Trust Management Languages", Proc. PADL, 2003, available at <<http://www.cs.purdue.edu/homes/ninghui/papers/cdatalog_padl03.pdf#search=%22%22Datalog%20with%20Constraints%3A%20A%20Foundation%20For%20Trust%20Management%20Languages%22%22>>, pp. 58-73.
Li, et al., "Design of a Role-based Trust Management Framework", Proceedings of the 2002 IEEE Symposium on Security and Privacy, 2002, available at <<http://www.cs.purdue.edu/homes/ninghui/papers/rt_oakland02.pdf#search=%22%22Design%20of%20a%20Role-Based%20Trust%20Management%20Framework%22%22>>, pp. 114-130.
"OASIS", Security Assertion Markup Language (SAML), accessed on Sep. 27, 2006 from <<www.oasis-open.org/committees/security>>, 8 pages.
"OASIS", eXtensible Access Control Markup Language (XACML) Version 2.0 Core Specification, 2005, accessed on Sep. 27, 2006 at <<www.oasis-open.org/committees/xacml/, 6 pages.
"RFC 3280—Internet X.409 Public Key Infrastructure Certificate and Certificate Revocation List (CRL) Profile", IETF, retrieved on Sep. 22, 2006 from <<http://www.faqs.org/rfcs/rfc3280.html>, Apr. 2002, 8 pages.
Ribeiro, et al., "SPL: An access control language for security policies with comples constraints", retrieved at <<http://www.gsd.inesc-id.pt/~cnr/splii.pdf>>, IST/INESC, Portugal, pp. 1-22.
Rivest, et al., "SDSI—A Simple Distributed Security Infrastructure", available at <<http://theory.lcs.mit.edu/~rivest/sdsi10.ps>>, Apr. 30, 1996, pp. 1-37.
Wu, et al., "Evaluation of Authorization-Authentication Tools: PERMIS, OASIS, XACML, and SHIBOLETH", Technical Report CS-TR-935, University of Newcastle upon Tyne, 2005.
Bindings for the OASIS Security Assertion Markup Language (SAML) V2.0, OASIS Standard, Mar. 15, 2005.
"Security Assertion Markup Language (SAML) 2.0 Technical Overview", OASIS, Working Draft 01, Jul. 22, 2004, pp. 1-36.
Farrell et al., "Assertions and Protocols for the OASIS Security Assertion Markup Language (SAML) V2.0", OASIS Open, 2004, Aug. 2004, pp. 1-87.
Office Action from the U.S. Patent and Trademark Office for U.S. Appl. No. 11/530,446, mailed on Jul. 30, 2010, 29 pages.
Hallam-Baker et al., " Web Services Security: SAML Token Profile", OASIS Open, Sep. 23, 2002, pp. 1-25.
Hallam-Barker, "Security Assertion Markup Language Straw-man Architecture", VeriSign, 2001, Feb. 16, 2001, pp. 1-17.
Keoh et al., "Towards Flexible Credential Verification in Mobile Ad-hoc Networks", ACM 2002, POMC '02, Oct. 30-31, 2002, pp. 58-65.
Navarro et al., "Constrained delegation in XML-based Access Control and Digital Right Management Standards", Communication, Network and Information Security 2003, pp. 1-6.
Office Action from the U.S. Patent and Trademark Office for U.S. Appl. No. 11/530,443, mailed on Jun. 1, 2010, 30 pages.
Office Action from the U.S. Patent and Trademark Office for U.S. Appl. No. 11/530,543, mailed on Jul. 8, 2010, 12 pages.
Stoller, "Trust Management A Tutorial", Stony Brook University, State University of New York, May 2006, pp. 1-118.
Wang et al., "Extending the Security Assertion Markup Language to Support Delegation for Web Services and Grid Services", IEEE International Conference on Web Services 2005, Orlando, FL, Jul. 12-15, 2005, pp. 1-8.

* cited by examiner

Example Assertion Format

Example Translation Method from Security Language to Logic Language

Example Deterministic Evaluation Algorithm with Tabling
900

Conditional Rule

Logic Language Proof Fragment

Corresponding to

Security Language Proof Fragment

Delegation Rule

Logic Language Proof Fragment

Corresponding to

Security Language Proof Fragment

1400A

Alias
Rule

Logic Language
Proof Fragment

Corresponding to

Security Language
Proof Fragment

1400B

SECURITY LANGUAGE TRANSLATIONS WITH LOGIC RESOLUTION

BACKGROUND

Computers and other electronic devices are pervasive in the professional and personal lives of people. In professional settings, people exchange and share confidential information during project collaborations. In personal settings, people engage in electronic commerce and the transmission of private information. In these and many other instances, electronic security is deemed to be important.

Electronic security paradigms can keep professional information confidential and personal information private. Electronic security paradigms may involve some level of encryption and/or protection against malware, such as viruses, worms, and spyware. Both encryption of information and protection from malware have historically received significant attention, especially in the last few years.

However, controlling access to information is an equally important aspect of securing the safety of electronic information. This is particularly true for scenarios in which benefits are derived from the sharing and/or transferring of electronic information. In such scenarios, certain people are to be granted access while others are to be excluded.

Access control has been a common feature of shared computers and application servers since the early time-shared systems. There are a number of different approaches that have been used to control access to information. They share a common foundation in combining authentication of the entity requesting access to some resource with a mechanism of authorizing the allowed access. Authentication mechanisms include passwords, Kerberos, and x.509 certificates. Their purpose is to allow a resource-controlling entity to positively identify the requesting entity or information about the entity that it requires.

Authorization examples include access control lists (ACLs) and policy-based mechanisms such as the eXtensible Access Control Markup Language (XACML) or the PrivilEge and Role Management Infrastructure (PERMIS). These mechanisms define what entities may access a given resource, such as files in a file system, hardware devices, database information, and so forth. They perform this authorization by providing a mapping between authenticated information about a requester and the allowed access to a resource.

As computer systems have become more universally connected over large networks such as the Internet, these mechanisms have proven to be somewhat limited and inflexible in dealing with evolving access control requirements. Systems of geographically dispersed users and computer resources, including those that span multiple administrative domains, in particular present a number of challenges that are poorly addressed by currently-deployed technology.

SUMMARY

Security language constructs may be translated into logic language constructs and vice versa. Logic resolution may be effected using, for example, the logic language constructs. In an example implementation, translation of a security language assertion into at least one logic language rule is described. In another example implementation, translation of a proof graph reflecting a logic language into a proof graph reflecting a security language is described. In yet another example implementation, evaluation of a logic language program using a deterministic algorithm is described.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, protocol, etc. implementations are described herein.

BRIEF DESCRIPTION OF THE DRAWINGS

The same numbers are used throughout the drawings to reference like and/or corresponding aspects, features, and components.

DETAILED DESCRIPTION

Example Security Environments

Figure 1:
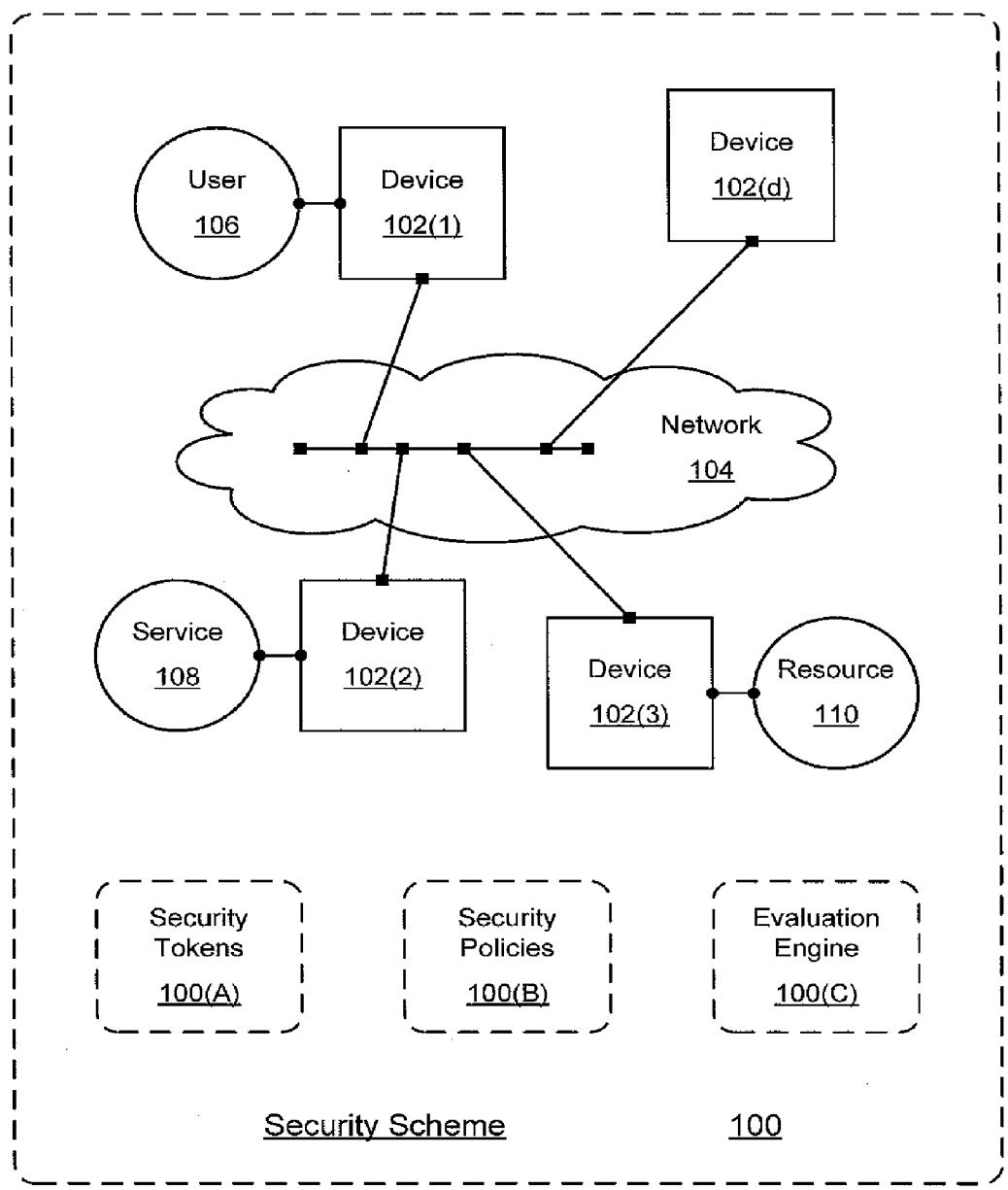
FIG. 1 is a block diagram illustrating an example general environment in which an example security scheme may be implemented.

FIG. 1 is a block diagram illustrating an example general environment in which an example security scheme 100 may be implemented. Security scheme 100 represents an integrated approach to security. As illustrated, security scheme 100 includes a number of security concepts: security tokens 100(A), security policies 100(B), and an evaluation engine 100(C). Generally, security tokens 100(A) and security policies 100(B) jointly provide inputs to evaluation engine 100 (C). Evaluation engine 100(C) accepts the inputs and produces an authorization output that indicates if access to some resource should be permitted or denied.

In a described implementation, security scheme 100 can be overlaid and/or integrated with one or more devices 102, which can be comprised of hardware, software, firmware, some combination thereof, and so forth. As illustrated, "d" devices, with "d" being some integer, are interconnected over one or more networks 104. More specifically, device 102(1), device 102(2), device 102(3) ... device 102(d) are capable of communicating over network 104.

Each device 102 may be any device that is capable of implementing at least a part of security scheme 100. Examples of such devices include, but are not limited to, computers (e.g., a client computer, a server computer, a personal computer, a workstation, a desktop, a laptop, a palmtop, etc.), game machines (e.g., a console, a portable game device, etc.), set-top boxes, televisions, consumer electronics (e.g., DVD player/recorders, camcorders, digital video recorders (DVRs), etc.), personal digital assistants (PDAs), mobile phones, portable media players, some combination thereof, and so forth. An example electronic device is described herein below with particular reference to FIG. 4.

Network 104 may be formed from any one or more networks that are linked together and/or overlaid on top of each other. Examples of networks 104 include, but are not limited to, an internet, a telephone network, an Ethernet, a local area network (LAN), a wide area network (WAN), a cable network, a fibre network, a digital subscriber line (DSL) network, a cellular network, a Wi-Fi® network, a WiMAX® network, a virtual private network (VPN), some combination thereof, and so forth. Network 104 may include multiple domains, one or more grid networks, and so forth. Each of these networks or combination of networks may be operating in accordance with any networking standard.

As illustrated, device 102(1) corresponds to a user 106 that is interacting with it. Device 102(2) corresponds to a service 108 that is executing on it. Device 102(3) is associated with a resource 110. Resource 110 may be part of device 102(3) or separate from device 102(3).

User 106, service 108, and a machine such as any given device 102 form a non-exhaustive list of example entities. Entities, from time to time, may wish to access resource 110. Security scheme 100 ensures that entities that are properly authenticated and authorized are permitted to access resource 110 while other entities are prevented from accessing resource 110.

Figure 2:
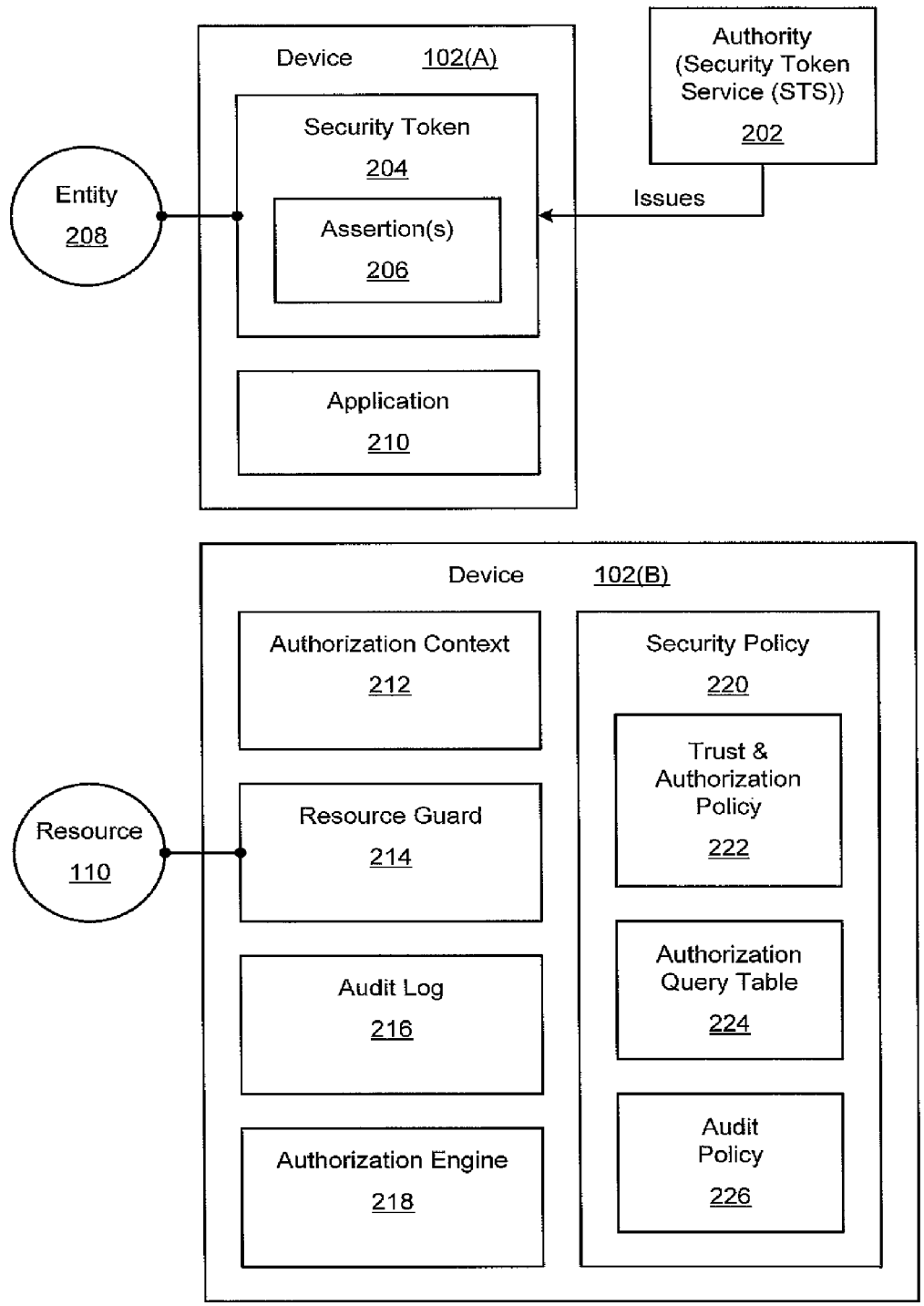
FIG. 2 is a block diagram illustrating an example security environment having two devices and a number of example security-related components.

FIG. 2 is a block diagram illustrating an example security environment 200 having two devices 102(A) and 102(B) and a number of example security-related components. Security environment 200 also includes an authority 202, such as a security token service (STS) authority. Device 102(A) corresponds to an entity 208. Device 102(B) is associated with resource 110. Although a security scheme 100 may be implemented in more complex environments, this relatively-simple two-device security environment 200 is used to describe example security-related components.

As illustrated, device 102(A) includes two security-related components: a security token 204 and an application 210. Security token 204 includes one or more assertions 206. Device 102(B) includes five security-related components: an authorization context 212, a resource guard 214, an audit log 216, an authorization engine 218, and a security policy 220.

Security policy 220 includes a trust and authorization policy 222, an authorization query table 224, and an audit policy 226.

Each device 102 may be configured differently and still be capable of implementing all or a part of security scheme 100. For example, device 102(A) may have multiple security tokens 204 and/or applications 210. As another example, device 102(B) may not include an audit log 216 or an audit policy 226. Other configurations are also possible.

In a described implementation, authority 202 issues security token 204 having assertions 206 to entity 208. Assertions 206 are described herein below, including in the section entitled "Security Policy Assertion Language Example Characteristics". Entity 208 is therefore associated with security token 204. In operation, entity 208 wishes to use application 210 to access resource 110 by virtue of security token 204.

Resource guard 214 receives requests to access resource 110 and effectively manages the authentication and authorization process with the other security-related components of device 102(B). Trust and authorization policy 222, as its name implies, includes policies directed to trusting entities and authorizing actions within security environment 200. Trust and authorization policy 222 may include, for example, security policy assertions (not explicitly shown in FIG. 2). Authorization query table 224 maps requested actions, such as access requests, to an appropriate authorization query. Audit policy 226 delineates audit responsibilities and audit tasks related to implementing security scheme 100 in security environment 200.

Authorization context 212 collects assertions 206 from security token 204, which is/are used to authenticate the requesting entity, and security policy assertions from trust and authorization policy 222. These collected assertions in authorization context 212 form an assertion context. Hence, authorization context 212 may include other information in addition to the various assertions.

The assertion context from authorization context 212 and an authorization query from authorization query table 224 are provided to authorization engine 218. Using the assertion context and the authorization query, authorization engine 218 makes an authorization decision. Resource guard 214 responds to the access request based on the authorization decision. Audit log 216 contains audit information such as, for example, identification of the requested resource 110 and/or the algorithmic evaluation logic performed by authorization engine 218.

Figure 3:
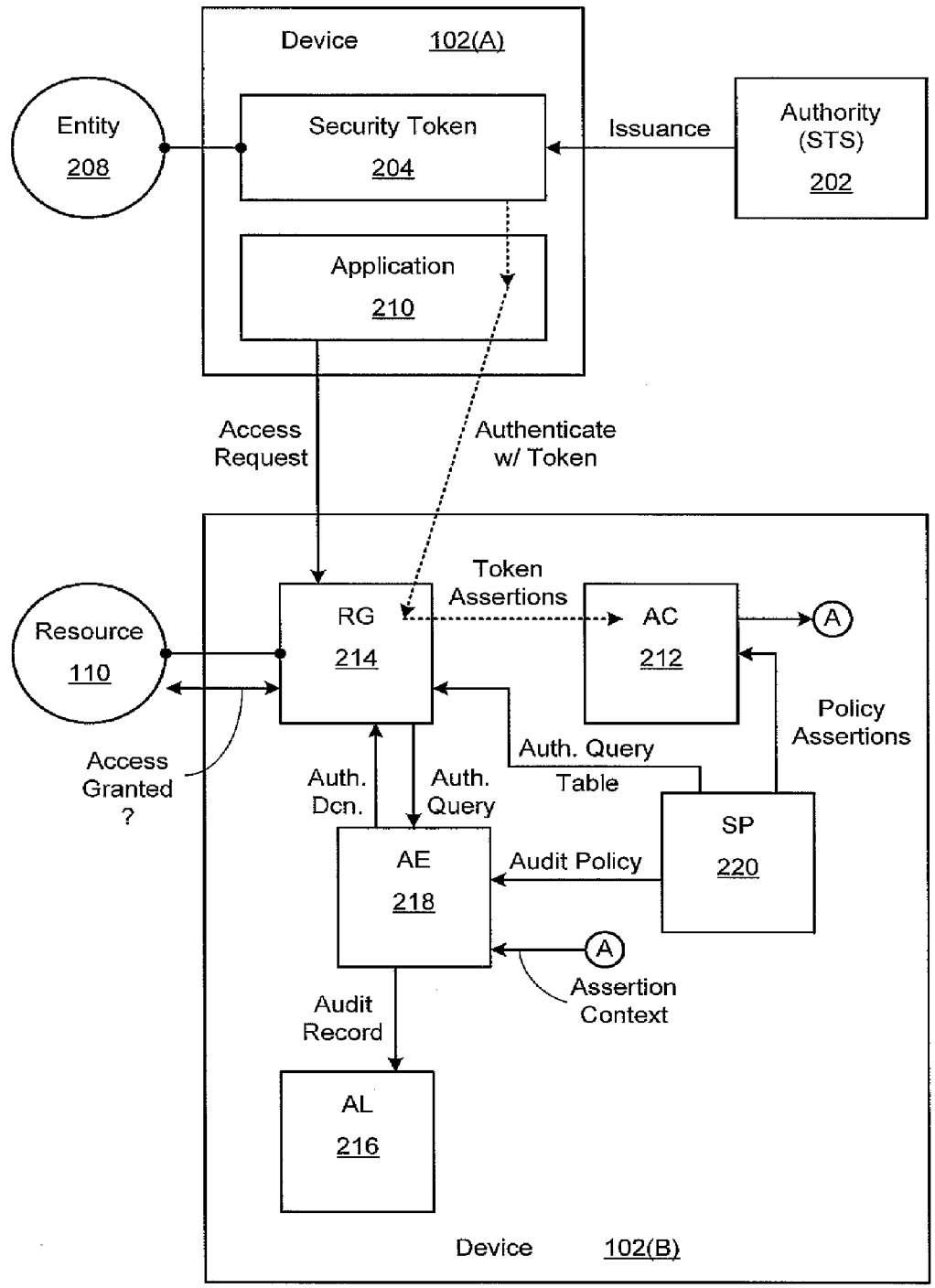
FIG. 3 is a block diagram illustrating the example security environment of FIG. 2 in which example security-related data is exchanged among the security-related components.

FIG. 3 is a block diagram illustrating example security environment 200 in which example security-related data is exchanged among the security-related components. The security-related data is exchanged in support of an example access request operation. In this example access request operation, entity 208 wishes to access resource 110 using application 210 and indicates its authorization to do so with security token 204. Hence, application 210 sends an access request* to resource guard 214. In this description of FIG. 3, an asterisk (i.e., "*") indicates that the stated security-related data is explicitly indicated in FIG. 3.

In a described implementation, entity 208 authenticates* itself to resource guard 214 with a token*, security token 204. Resource guard 214 forwards the token assertions* to authorization context 212. These token assertions are assertions 206 (of FIG. 2) of security token 204. Security policy 220 provides the authorization query table* to resource guard 214. The authorization query table derives from authorization query table module 224. The authorization query table sent to resource guard 214 may be confined to the portion or portions directly related to the current access request.

Policy assertions are extracted from trust and authorization policy 222 by security policy 220. The policy assertions may include both trust-related assertions and authorization-related assertions. Security policy 220 forwards the policy assertions* to authorization context 212. Authorization context 212 combines the token assertions and the policy assertions into an assertion context. The assertion context* is provided from authorization context 212 to authorization engine 218 as indicated by the encircled "A".

An authorization query is ascertained from the authorization query table. Resource guard 214 provides the authorization query (auth. query*) to authorization engine 218. Authorization engine 218 uses the authorization query and the assertion context in an evaluation algorithm to produce an authorization decision. The authorization decision (auth. dcn.*) is returned to resource guard 214. Whether entity 208 is granted access* to resource 110 by resource guard 214 is dependent on the authorization decision. If the authorization decision is affirmative, then access is granted. If, on the other hand, the authorization decision issued by authorization engine 218 is negative, then resource guard 214 does not grant entity 208 access to resource 110.

The authorization process can also be audited using semantics that are complementary to the authorization process. The auditing may entail monitoring of the authorization process and/or the storage of any intermediate and/or final products of, e.g., the evaluation algorithm logically performed by authorization engine 218. To that end, security policy 220 provides to authorization engine 218 an audit policy* from audit policy 226. At least when auditing is requested, an audit record* having audit information may be forwarded from authorization engine 218 to audit log 216. Alternatively, audit information may be routed to audit log 216 via resource guard 214, for example, as part of the authorization decision or separately.

Figure 4:
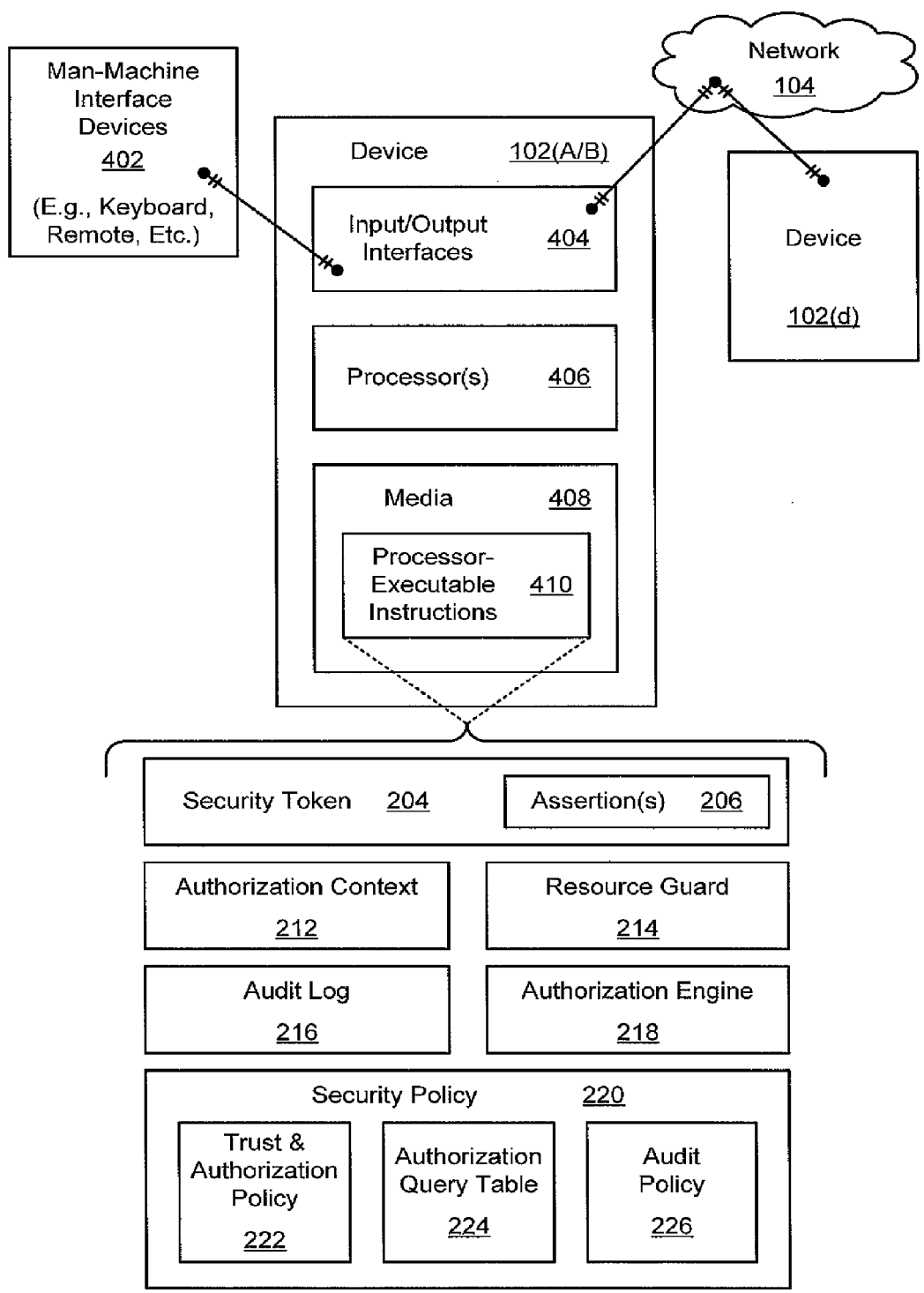
FIG. 4 is a block diagram of an example device that may be used for security-related implementations as described herein.

FIG. 4 is a block diagram of an example device 102 that may be used for security-related implementations as described herein. Multiple devices 102 are capable of communicating across one or more networks 104. As illustrated, two devices 102(A/B) and 102(d) are capable of engaging in communication exchanges via network 104. Although two devices 102 are specifically shown, one or more than two devices 102 may be employed, depending on the implementation.

Generally, a device 102 may represent any computer or processing-capable device, such as a client or server device; a workstation or other general computer device; a PDA; a mobile phone; a gaming platform; an entertainment device; one of the devices listed above with reference to FIG. 1; some combination thereof; and so forth. As illustrated, device 102 includes one or more input/output (I/O) interfaces 404, at least one processor 406, and one or more media 408. Media 408 include processor-executable instructions 410.

In a described implementation of device 102, I/O interfaces 404 may include (i) a network interface for communicating across network 104, (ii) a display device interface for displaying information on a display screen, (iii) one or more man-machine interfaces, and so forth. Examples of (i) network interfaces include a network card, a modem, one or more ports, and so forth. Examples of (ii) display device interfaces include a graphics driver, a graphics card, a hardware or software driver for a screen or monitor, and so forth. Printing device interfaces may similarly be included as part of I/O interfaces 404. Examples of (iii) man-machine interfaces include those that communicate by wire or wirelessly to man-machine interface devices 402 (e.g., a keyboard, a remote, a mouse or other graphical pointing device, etc.).

Generally, processor 406 is capable of executing, performing, and/or otherwise effectuating processor-executable instructions, such as processor-executable instructions 410. Media 408 is comprised of one or more processor-accessible media. In other words, media 408 may include processor-executable instructions 410 that are executable by processor 406 to effectuate the performance of functions by device 102.

Thus, realizations for security-related implementations may be described in the general context of processor-executable instructions. Generally, processor-executable instructions include routines, programs, applications, coding, modules, protocols, objects, components, metadata and definitions thereof, data structures, application programming interfaces (APIs), schema, etc. that perform and/or enable particular tasks and/or implement particular abstract data types. Processor-executable instructions may be located in separate storage media, executed by different processors, and/or propagated over or extant on various transmission media.

Processor(s) 406 may be implemented using any applicable processing-capable technology. Media 408 may be any available media that is included as part of and/or accessible by device 102. It includes volatile and non-volatile media, removable and non-removable media, and storage and transmission media (e.g., wireless or wired communication channels). For example, media 408 may include an array of disks/flash memory/optical media for longer-term mass storage of processor-executable instructions 410, random access memory (RAM) for shorter-term storing of instructions that are currently being executed, link(s) on network 104 for transmitting communications (e.g., security-related data), and so forth.

As specifically illustrated, media 408 comprises at least processor-executable instructions 410. Generally, processor-executable instructions 410, when executed by processor 406, enable device 102 to perform the various functions described herein, including those actions that are illustrated in the various flow diagrams. By way of example only, processor-executable instructions 410 may include a security token 204, at least one of its assertions 206, an authorization context module 212, a resource guard 214, an audit log 216, an authorization engine 218, a security policy 220 (e.g., a trust and authorization policy 222, an authorization query table 224, and/or an audit policy 226, etc.), some combination thereof, and so forth. Although not explicitly shown in FIG. 4, processor-executable instructions 410 may also include an application 210 and/or a resource 110.

Security Policy Assertion Language Example Characteristics

This section describes example characteristics of an implementation of a security policy assertion language (SecPAL). The SecPAL implementation of this section is described in a relatively informal manner and by way of example only. It has an ability to address a wide spectrum of security policy and security token obligations involved in creating an end-to-end solution. These security policy and security token obligations include, by way of example but not limitation: describing explicit trust relationships; expressing security token issuance policies; providing security tokens containing identities, attributes, capabilities, and/or delegation policies; expressing resource authorization and delegation policies; and so forth.

In a described implementation, SecPAL is a declarative, logic-based language for expressing security in a flexible and tractable manner. It can be comprehensive, and it can provide a uniform mechanism for expressing trust relationships, authorization policies, delegation policies, identity and attribute assertions, capability assertions, revocations, audit requirements, and so forth. This uniformity provides tangible benefits in terms of making the security scheme understandable and analyzable. The uniform mechanism also improves security assurance by allowing one to avoid, or at least significantly curtail, the need for semantic translation and reconciliation between disparate security technologies.

A SecPAL implementation may include any of the following example features: [1] SecPAL can be relatively easy to understand. It may use a definitional syntax that allows its assertions to be read as English-language sentences. Also, its grammar may be restricted such that it requires users to understand only a few subject-verb-object (e.g., subject-verb phrase) constructs with cleanly defined semantics. Finally, the algorithm for evaluating the deducible facts based on a collection of assertions may rely on a small number of relatively simple rules.

[2] SecPAL can leverage industry standard infrastructure in its implementation to ease its adoption and integration into existing systems. For example, an extensible markup language (XML) syntax may be used that is a straightforward mapping from the formal model. This enables use of standard parsers and syntactic correctness validation tools. It also allows use of the W3C XML Digital Signature and Encryption standards for integrity, proof of origin, and confidentiality.

[3] SecPAL may enable distributed policy management by supporting distributed policy authoring and composition. This allows flexible adaptation to different operational models governing where policies, or portions of policies, are authored based on assigned administrative duties. Use of standard approaches to digitally signing and encrypting policy objects allow for their secure distribution. [4] SecPAL enables an efficient and safe evaluation. Simple syntactic checks on the inputs are sufficient to ensure evaluations will terminate and produce correct answers.

[5] SecPAL can provide a complete solution for access control requirements supporting required policies, authorization decisions, auditing, and a public-key infrastructure (PKI) for identity management. In contrast, most other approaches only manage to focus on and address one subset of the spectrum of security issues. [6] SecPAL may be sufficiently expressive for a number of purposes, including, but not limited to, handling the security issues for Grid environments and other types of distributed systems. Extensibility is enabled in ways that maintain the language semantics and evaluation properties while allowing adaptation to the needs of specific systems.

Figure 5:
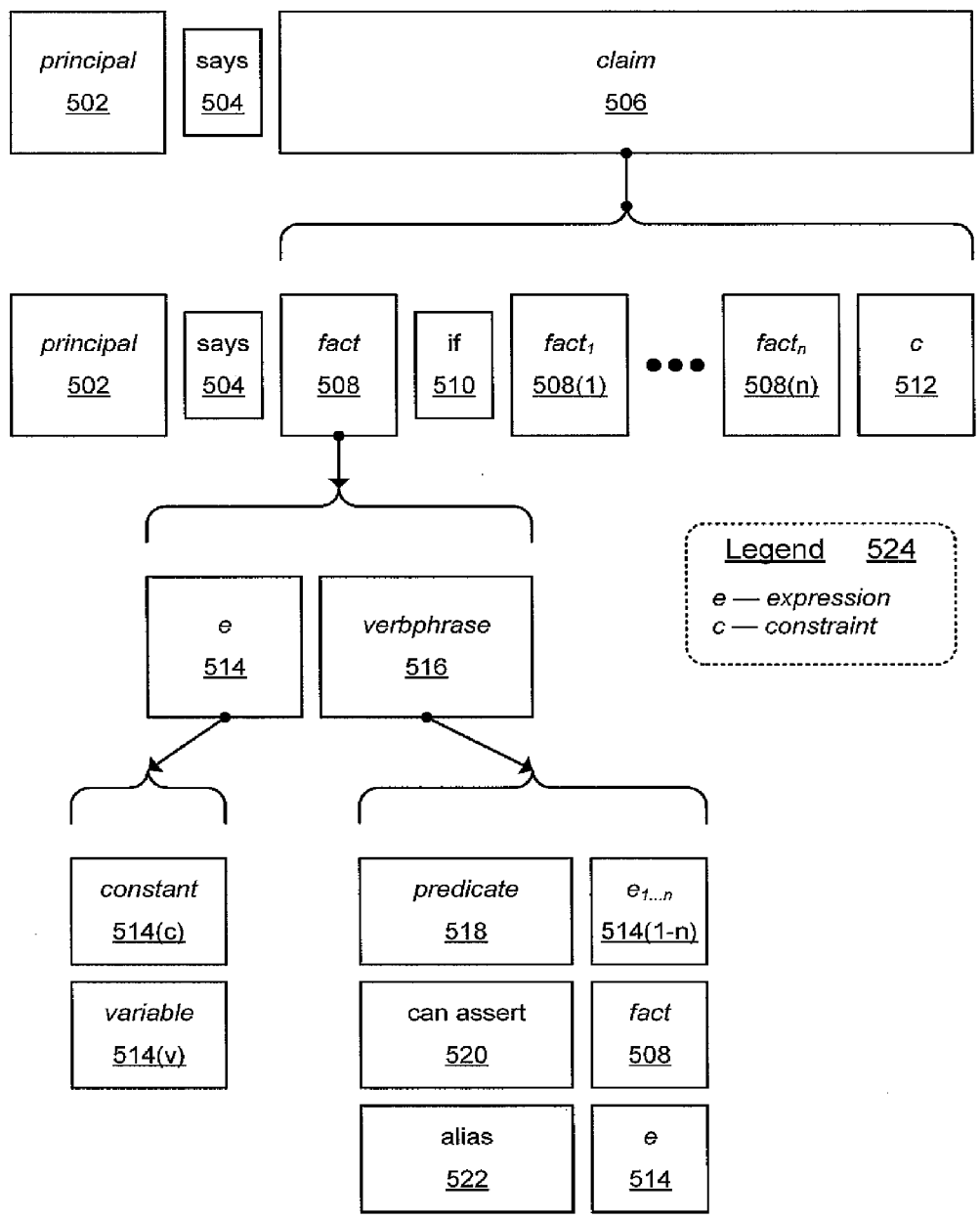
FIG. 5 is a block diagram illustrating an example assertion format for a general security scheme.

FIG. 5 is a block diagram illustrating an example assertion format 500 for a general security scheme. Security scheme assertions that are used in the implementations described otherwise herein may differ from example assertion format 500. However, assertion format 500 is a basic illustration of one example format for security scheme assertions, and it provides a basis for understanding example described implementation of various aspects of a general security scheme.

As illustrated at the top row of assertion format 500, an example assertion at a broad level includes: a principal portion 502, a says portion 504, and a claim portion 506. Textually, the broad level of assertion format 500 may be represented by: principal says claim.

At the next row of assertion format 500, claim portion 506 is separated into example constituent parts. Hence, an example claim portion 506 includes: a fact portion 508, an if portion 510, "n" conditional fact$_{1...n}$ portions 508(1 . . . n), and a c portion 512. The subscript "n" represents some integer value. As indicated by legend 524, c portion 512 represents a constraint portion. Although only a single constraint is illustrated, c portion 512 may actually represent multiple constraints (e.g., $c_1, \ldots, c_m$). The set of conditional fact portions 508(1 . . . n) and constraints 512(1 . . . m) on the right-hand side of if portion 510 may be termed the antecedent.

Textually, claim portion 506 may be represented by: fact if fact$_1$, . . . , fact$_n$, c. Hence, the overall assertion format 500 may be represented textually as follows: principal says fact if fact$_1$, . . . , fact$_n$, c. However, an assertion may be as simple as: principal says fact. In this abbreviated, three-part version of an assertion, the conditional portion that starts with if portion 510 and extends to c portion 512 is omitted.

Each fact portion 508 may also be further subdivided into its constituent parts. Example constituent parts are: an e portion 514 and a verb phrase portion 516. As indicated by legend 524, e portion 514 represents an expression portion. Textually, a fact portion 508 may be represented by: e verbphrase.

Each e or expression portion 514 may take on one of two example options. These two example expression options are: a constant 514(c) and a variable 514(v). Principals may fall under constants 514(c) and/or variables 514(v).

Each verb phrase portion 516 may also take on one of three example options. These three example verb phrase options are: a predicate portion 518 followed by one or more $e_{1 \ldots n}$ portions 514(1 . . . n), a can assert portion 520 followed by a fact portion 508, and an alias portion 522 followed by an expression portion 514. Textually, these three verb phrase options may be represented by: predicate $e_1 \ldots e_n$, can assert fact, and alias e, respectively. The integer "n" may take different values for facts 508(1 . . . n) and expressions 514(1 . . . n).

Generally, SecPAL statements are in the form of assertions made by a security principal. Security principals are typically identified by cryptographic keys so that they can be authenticated across system boundaries. In their simplest form, an assertion states that the principal believes a fact is valid (e.g., as represented by a claim 506 that includes a fact portion 508). They may also state a fact is valid if one or more other facts are valid and some set of conditions are satisfied (e.g., as represented by a claim 506 that extends from a fact portion 508 to an if portion 510 to conditional fact portions 508(1 . . . n) to a c portion 512). There may also be conditional facts 508(1 . . . n) without any constraints 512 and/or constraints 512 without any conditional facts 508(1 . . . n).

In a described implementation, facts are statements about a principal. Four example types of fact statements are described here in this section. First, a fact can state that a principal has the right to exercise an action(s) on a resource with an "action verb". Example action verbs include, but are not limited to, call, send, read, list, execute, write, modify, append, delete, install, own, and so forth. Resources may be identified by universal resource indicators (URIs) or any other approach.

Second, a fact can express the binding between a principal identifier and one or more attribute(s) using the "possess" verb. Example attributes include, but are not limited to, email name, common name, group name, role title, account name, domain name server/service (DNS) name, internet protocol (IP) address, device name, application name, organization name, service name, account identification/identifier (ID), and so forth. An example third type of fact is that two principal identifiers can be defined to represent the same principal using the "alias" verb.

"Qualifiers" or fact qualifiers may be included as part of any of the above three fact types. Qualifiers enable an assertor to indicate environmental parameters (e.g., time, principal location, etc.) that it believes should hold if the fact is to be considered valid. Such statements may be cleanly separated between the assertor and a relying party's validity checks based on these qualifier values.

An example fourth type of fact is defined by the "can assert" verb. This "can assert" verb provides a flexible and powerful mechanism for expressing trust relationships and delegations. For example, it allows one principal (A) to state its willingness to believe certain types of facts asserted by a second principal (B). For instance, given the assertions "A says B can assert fact0" and "B says fact0", it can be concluded that A believes fact0 to be valid and therefore it can be deduced that "A says fact0".

Such trust and delegation assertions may be (i) unbounded and transitive to permit downstream delegation or (ii) bounded to preclude downstream delegation. Although qualifiers can be applied to "can assert" type facts, omitting support for qualifiers to these "can assert" type facts can significantly simplify the semantics and evaluation safety properties of a given security scheme.

In a described implementation, concrete facts can be stated, or policy expressions may be written using variables. The variables are typed and may either be unrestricted (e.g., allowed to match any concrete value of the correct type) or restricted (e.g., required to match a subset of concrete values based on a specified pattern).

Security authorization decisions are based on an evaluation algorithm (e.g., that may be conducted at authorization engine 218) of an authorization query against a collection of assertions (e.g., an assertion context) from applicable security policies (e.g., a security policy 220) and security tokens (e.g., one or more security tokens 204). Authorization queries are logical expressions, which may become quite complex, that combine facts and/or conditions. These logical expressions may include, for example, AND, OR, and/or NOT logical operations on facts, either with or without attendant conditions and/or constraints.

This approach to authorization queries provides a flexible mechanism for defining what must be known and valid before a given action is authorized. Query templates (e.g., from authorization query table 224) form a part of the overall security scheme and allow the appropriate authorization query to be declaratively stated for different types of access requests and other operations/actions.

Example Implementations for Security Language Translations with Logic Resolution Security is critical in modern computing systems. Security may be facilitated with an efficient, high assurance, and flexible mechanism for determining authorized access. This is achievable using a policy-based approach. In such systems, policy can change to reflect current needs without having to change the underlying code for making and enforcing access decisions.

Existing approaches fail to fully meet these needs, especially in complex distributed computing environments. Simple rule-based policies, such as ACLs, are very efficient but not sufficiently flexible. More complex rule-based policy systems such as XACML offer more flexibility in return for a less efficient evaluation. Furthermore, such rule-based policy systems still have functional limitations (e.g., the lack of delegation support).

Conventional logic-based policy models generally offer the best functionality, but they are not without other problems. Some of these models do not offer adequate evaluation safety properties. In other words, a given authorization decision algorithm can not be guaranteed to terminate. Some are highly inefficient. Still others are theoretically sound, but they are not considered practical to implement in commercial systems.

What is needed is a logic-based security policy language that is both practical to implement and highly flexible and that has the requisite evaluation safety properties that ensure efficient evaluation as well as guaranteed termination. Described implementations of an example security policy language provide improvements in these areas.

In the sections that follow, an example security language is described. In many locations, the description is precise inasmuch as it provides a security language model that is supportable by a relatively-rigorous logical foundation. The example described implementations that include a rigorous logical foundation are provided to ensure that the theoretical underpinnings are understood. However, any given real-world implementations of a security language may not include any particular (much less all) of the aspects of the rigorous logical descriptions. Thus, the invention of the instant application is to be defined by the claims and not by any particular detailed implementations that are described herein.

1 Introduction to Security Language Expressions for Logic Resolution

Multiple example implementations for the expressions of a security language are provided herein. The implementations are designed such that the resulting security policies can be resolved logically in an efficient and certain manner.

Figure 6:
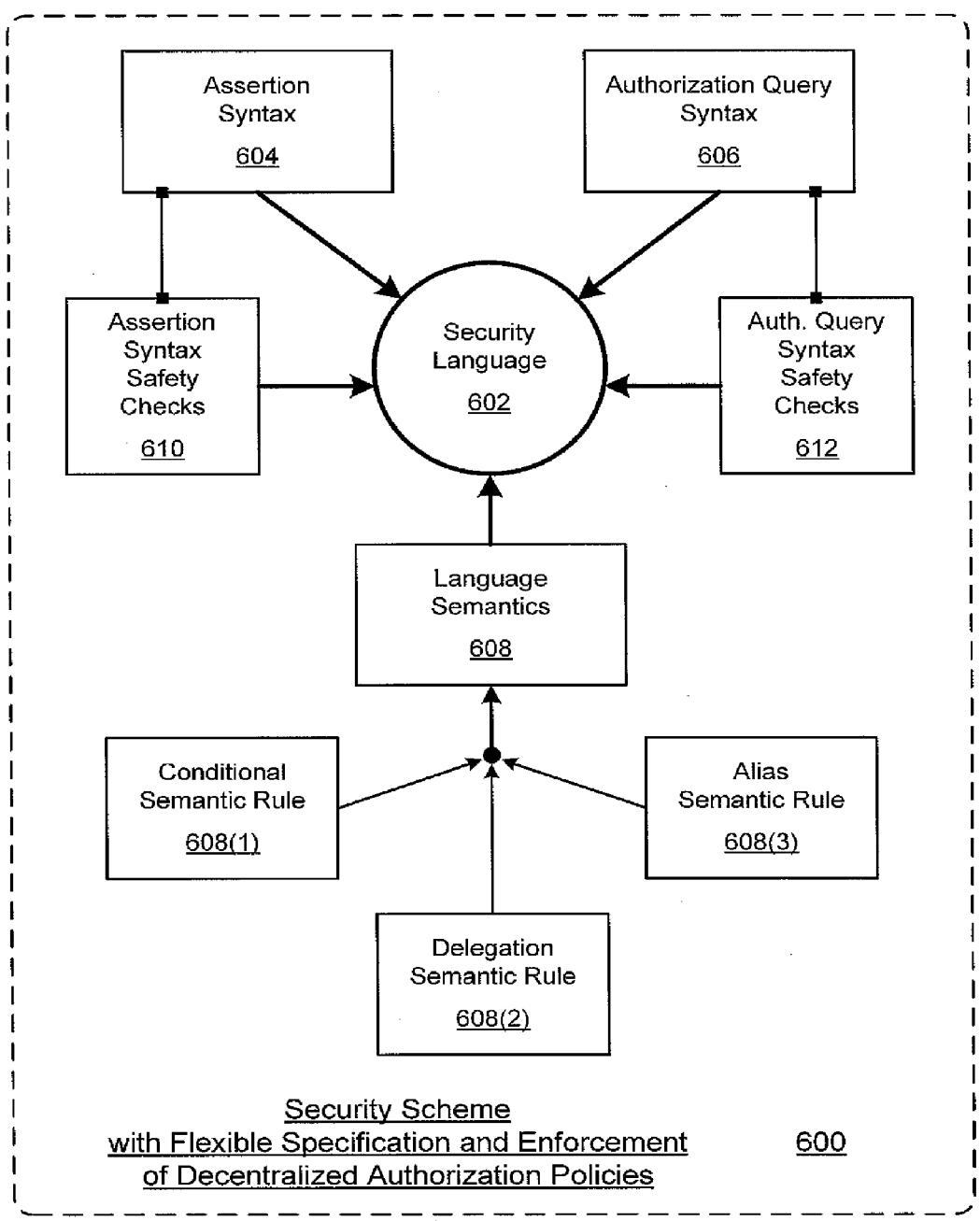
FIG. 6 is a block diagram illustrating an example security scheme having a security language that enables flexible specification and enforcement of decentralized authorization polices.

FIG. 6 is a block diagram illustrating an example security scheme 600 having a security language 602 that enables flexible specification and enforcement of decentralized authorization polices. Security scheme 600 includes an assertion syntax 604 and an authorization query syntax 606. Security scheme also includes a number of semantics rules 608($x$). Example semantics rules include, but are not limited to: conditional semantics rule 608(1), delegation semantics rule 608(2), and alias semantics rule 608(3). These semantics rules 608($x$) jointly form language semantics 602.

Assertion syntax 604, authorization query syntax 606, and language semantics 608 each contribute to the formation and governance of example security language 602. Security scheme also includes assertion syntax safety checks 610 and authorization query safety checks 612. Assertion syntax safety checks 610 and authorization query safety checks 612 may be integrated into security language 602 to help ensure authorization query tractability.

In section 2 below, example syntax and semantics for assertions of the security language are described. In section 3, example syntax and semantics for authorization queries are described. In section 4, safety principles for the assertions and authorization queries are described. These safety properties, when properly applied, can guarantee that an authorization query evaluation will terminate and can ensure that the evaluation will proceed efficiently.

2 Syntax and Semantics of Example Security Language

A core syntax for an example security language is described here. Additional syntax for a security language may provide for the grouping of assertions, for example to delegate a series of rights in a single assertion; however, additions such as these can be reduced to the core syntax. An example implementation of the security language may also enforce a typing discipline for constants, functions, and variables, but such typing enforcement is omitted here to concentrate on the core syntax.

Assertions

Authorization policies are specified as sets of assertions of the form

A says fact if $fact_1, \ldots, fact_n$, c where the facts range over predicates that state properties on principals, for example that someone has the right to read a file. In an example implementation, assertions may be similar to Horn clauses, with the difference that (1) they are qualified by some principal A who issues and vouches for the asserted claim; (2) facts can be nested, using the keyword can assert, by means of which delegation rights are specified; and (3) variables in the assertion are constrained by c, a first order formula that can express, e.g., temporal, inequality, tree structure, regular expression constraints, and so forth.

The following listing sets forth assertion syntax 604 terminology as used herein.

| | | | |
|---|---|---|---|
| A | ∈ | Constants | (strings and integers) |
| x | ∈ | Variables | (infinite set of variables) |
| predicate | ∈ | PredicateNames | (predicate name, e.g possesses, can) |
| e | ::= | x | |
| | \| | A | |
| verbphrase | ::= | predicate $e_1 \ldots e_n$ | for n = Arity(pred) ≥ 0 |
| | \| | can assert$_\infty$ fact | (unbounded, transitive delegatn.) |
| | \| | can assert$_0$ fact | (one-step, non-transitive delegatn.) |
| | \| | alias e | |
| fact | ::= | e verbphrase | |
| claim | ::= | fact if fact$_1$, ..., fact$_n$,c | for some n ≥ 0 |
| assertion | ::= | A says claim | |
| AC | ::= | {assertion$_1$, ..., assertion$_n$} | (assertion context) |

In a described implementation, variables only range over strings and integers—but not predicates, facts, claims or assertions. A phrase of syntax is ground when it contains no variables. The set PredicateNames may not contain can assert$_\infty$, can assert$_0$, and alias. Functions and predicates have a fixed arity. A predicate is a verb phrase with holes for its object parameters. If it has multiple words, these holes may appear at any fixed position within it, e.g. has access from [-] till [-].

In the remainder of the text, we use A, B, C, and D as meta variables for constants, usually for denoting principals. We use a vector notation to denote a (possibly empty) list (or tuple) of items, e.g. we may write $f(\vec{e})$ for $f(e_1, \ldots, e_n)$.

Facts can be nested, as can be seen from the syntax definition above. Nested facts are of the form $e_1$ can assert$_{D1}$ ... $e_n$ can assert$_{Dn}$ fact, for some n≥1, where fact is flat, as defined next.

Two definitions are presented below. The first defines a flat fact, and the second defines parts of an assertion.

Definition 2.1. A fact is flat iff can assert does not occur in it, and nested otherwise.

For example, the fact Alice says Bob can read $f$ is flat, but Alice says Charlie can assert$_0$ Bob can read $f$ is not flat.

Definition 2.2, Let A says fact if fact$_1$, ..., fact$_n$, c be an assertion. Then A is its issuer, the fact$_i$ are its conditional facts, and c is its constraint. The fact may be considered the assertion's primary fact or asserted fact.

Constraints

Constraints range over any constraint domain that extends the example basic constraint domain shown below. Basic constraints include integer inequalities (e.g., for expressing temporal constraints), tree order constraints (e.g., for directories), and regular expressions (e.g., for ad hoc filtering). Examples of basic constraints are set forth below:

| | | | |
|---|---|---|---|
| A | ∈ | Constants | (strings and integers) |
| x | ∈ | Variables | (infinite set of variables) |
| f | ∈ | FunctionNames | (e.g. +, −, currentTime) |
| pattern | ∈ | RegularExpressions | |
| e | ::= | x | |
| | \| | A | |
| | \| | $f(e_1, \ldots, e_n)$ | for n = Arity(f) ≥ 0 |
| c | ::= | True | |
| | \| | $e_1 = e_2$ | |
| | \| | $e_1 \leq e_2$ | |
| | \| | $e_1 \preceq e_2$ | |
| | \| | e matches pattern | |
| | \| | not(c) | |
| | \| | $c_1, c_2$ | |

Additional constraints can be added without affecting decidability or significantly affecting tractability. However, it is preferred that the validity of ground constraints can be checked in polynomial time to maintain a desired level of tractability.

We use a sugared notation for constraints that can be derived from the basic ones, e.g. False, $e_1 \neq e_2$ or $c_1$ or $c_2$. In assertions, we usually omit the True constraint, and also omit the if when the assertion has no conditional facts.

Semantics

We now give a formal definition of the language semantics 608. We first define the denotation of a ground expression. The denotation of a constant A is just A, so [[A]]=A. The denotation of a function $f(\vec{e})$ is defined if $(\vec{e})$ is ground, and is also a constant, but may depend on the system state as well as [[$\vec{e}$]]. For example, [[CurrentTime()]] presumably returns a different constant when called at different times. However, we assume that a single authorization query evaluation is atomic with respect to system state. That is, even though an expression may be evaluated multiple times, its denotation is the same during a single evaluation.

For a given constraint c, we write $\models c$ iff it is valid. The following defines validity within the basic constraint domain.

| | |
|---|---|
| $\models$ True | |
| $\models e_1 = e_2$ | iff [[$e_1$]] and [[$e_2$]] are equal constants |
| $\models e_1 \leq e_2$ | iff [[$e_1$]] and [[$e_2$]] are integer constants and [[$e_1$]] ≤ [[$e_2$]] |
| $\models e_1 \preceq e_2$ | iff [[$e_1$]] and [[$e_2$]] are tree constants and [[$e_1$]] is a descendant of, or equal to, [[$e_2$]] |
| $\models$ e matches pattern | iff [[e]] is a string constant that matches pattern |
| $\models$ not(c) | iff $\models$ c does not hold |
| $\models c_1, c_2$ | iff $\models c_1$ and $\models c_2$ |

In the rest of this document, we refer to a substitution θ as a function mapping variables to constants and variables. Substitutions are extended to constraints, predicates, fact, claims, assertions etc. in the natural way, and are usually written in postfix notation. We write Vars(X) for the set of variables occurring in a phase of syntax X.

In a described implementation, the security language includes three deduction rules. We now present these three deduction rules to capture the semantics of the language. Each rule has a set of premises and a single consequence of the form AC, D$\models$A says fact where Vars(fact)=∅ and D∈{0, ∞}. Intuitively, the deduction relation holds if the consequence can be derived from the assertion context AC. If the derivation flag D=0, the Derivation Rule (can assert) is not used in the derivation.

Conditional semantics rule 608(1) is as follows:

$$(cond)\frac{(A \text{ says fact if } fact_1, \ldots, fact_k, c) \in AC \quad AC, D \models A \text{ says } fact_i\theta \text{ for all } i \in \{1\ldots k\} \models c\theta \text{ Vars}(\text{fact}\theta) = \phi}{AC, D \models A \text{ says fact}\theta}$$

Delegation semantics rule 608(2), with a "can assert" verb implementation for the general delegation-directive verb, is as follows:

$$(\text{can assert})\frac{AC, \infty \models A \text{ says } B \text{ can assert}_D \text{ fact} \quad AC, D \models B \text{ says fact}}{AC, \infty \models A \text{ says fact}}$$

Alias semantics rule 608(3) is as follows:

$$(\text{alias})\frac{AC, D \models A \text{ says } C \text{ verbphrase} \quad AC, D \models A \text{ says } B \text{ alias } C}{AC, D \models A \text{ says } B \text{ verbphrase}}$$

Rule (cond) allows the deduction of matching assertions in AC with all free variables substituted by constants. In a described strict logical implementation, the conditional facts must be deducible, and the substitution must also make the constraint(s) valid. The delegation flag D is propagated to all conditional facts.

In other words, given an assertion context AC, a delegation flag D, a principal A, and a substitution θ, we can derive "AC, D|=A says fact θ" if all of the following hold:
 (1) there is a rule "A says fact if $fact_1, \ldots, fact_k$, c" in the assertion context AC;
 (2) we can derive "AC, D|=A says $fact_i$ θ" for each "$fact_i$" in the list "$fact_1$", . . . , "$fact_k$";
 (3) the constraint "cθ" is valid; and
 (4) the fact "fact θ" is ground.

Rule (can assert) deduces an assertion made by A by combining a can assert assertion made by A and a matching assertion made by B. In a described strict logical implementation, this rule applies when the delegation flag is ∞. The matching assertion made by B must be proved with the delegation flag D obtained from A's can assert assertion.

In other words, given an assertion context AC, a principal A, and a fact fact, we can derive "AC, ∞ |=A says fact" if there is a principal B and a delegation flag D such that both of the following hold:
 (1) we can derive "AC, ∞ |=A says B can assert$_D$ fact"; and
 (2) we can derive "AC, D|=B says fact".

Rule (alias) states that any fact that holds for C also holds for B.

In other words, given an assertion context AC, a delegation flag D, principals A, B, and C, and a verb phrase "verbphrase", we can derive "AC, D|=A says B verbphrase" if both of the following hold:
 (1) we can derive "AC, D|=A says C verbphrase"; and
 (2) we can derive "AC, D|=A says B alias C".

The following propositions state basic properties of the deduction relation; they are established by induction on the rules above.

Proposition 2.3. If AC, D|=A says fact then Vars(fact)=∅.
Proposition 2.4. If AC, 0|=A says fact then AC, ∞ |=A says fact.
Proposition 2.5. If $AC_1$,D|=A says fact then for all $AC_2$ it holds that $AC_1 \cup AC_2$,D|=A says fact.

Proposition 2.6. Let $AC_A$ be the set of all assertions in AC whose issuer is A. AC, 0|=A says fact iff $AC_A$, 0|=A says fact.

3 Authorization Queries

Authorization requests are decided by querying an assertion context (containing local as well as imported assertions). In a described implementation of a logic language, an authorization query may include a collection of atomic queries of the form A says fact and constraints c, combined by logical connectives, including negation. An example authorization query syntax 606 is as follows:

| q | ::= | e says fact |
|---|---|---|
| | \| | $q_1, q_2$ |
| | \| | $q_1$ or $q_2$ |
| | \| | not(q) |
| | \| | c |

The resulting query language is more expressive than in other logic-based languages where only atomic queries are considered. For example, separation of duties, threshold and denying policies can be expressed by composing atomic queries with negation and constraints. In a described implementation, negation is not allowed within the assertion language, as coupling negation with a recursive language results in semantic ambiguities, and often to higher computational complexity or even undecidability. By restricting the use of negation to the level of authorization queries (rather than adding these features to the assertion language itself), we effectively separate it from recursion, thereby circumventing the problems usually associated with negation.

The semantics of queries is defined by the relation AC, θ ⊢ q. In the following, let ε be the empty substitution. Note that negated queries and constraints are grounded, and that conjunctions are not commutative, as the second query may be instantiated by the outcome of the first query.

| AC, θ ⊢ e says fact | if AC, ∞ |= eθ says factθ, and Dom(θ) ⊆ Vars(e says fact) |
|---|---|
| AC, $\theta_1\theta_2$ ⊢ $q_1, q_2$ | if AC, $\theta_1$ ⊢ $q_1$ and AC, $\theta_2$ ⊢ $q_2 \theta_1$ |
| AC, θ ⊢ $q_1$ or $q_2$ | if AC, θ ⊢ $q_1$ or AC, θ ⊢ $q_2$ |
| AC, ε ⊢ not q | if AC, ε ⊢ q does not hold and Vars(q) = ∅ |
| AC, ε ⊢ c | if |= c |

Given a query q and an authorization context AC, an authorization algorithm should return the set of all substitutions θ such that AC, θ ⊢ q. If the query is ground, the answer set will be either empty (meaning "no") or be a singleton set containing the empty substitution ε (meaning "yes"). If the query contains variables, then the substitutions in the answer set are all the variable assignments that make the query true.

In the following section, section 4, safety conditions for ensuring that this set of variable assignments is finite and meaningful are described. Section 9 below gives an algorithm for evaluating authorization queries.

Authorization Query Tables

Conceptually, authorization queries are part of the local policy and may be kept separate from imperative code. In a described implementation of a security language, authorization queries belonging to a local assertion context are kept in a single place, termed the authorization query table. The table provides an interface to authorization queries by mapping parameterized method names to queries. Upon a request, the resource guard calls a method (instead of issuing a query directly) that gets mapped by the table to an authorization query, which is then used to query the assertion context.

For example, an authorization query table could contain the mapping:
canAuthorizePayment(requester, payment)
Admin says requester possesses BankManagerID id,
not(Admin says requester has initiated payment)
If Alice attempts to authorize the payment Payment47, say, the resource guard calls canAuthorizePayment(Alice, Payment47), which triggers the query
Admin says Alice possesses BankManagerID id,
not(Admin says Alice has initiated Payment47), The resulting answer set (either an empty set if the request should be denied or a variable assignment for id) is returned to the resource guard who can then enforce the policy in accordance with the authorization decision.

4 Safety

In an example implementation of the security language, the authorization algorithm is required to terminate and return a complete set of answers with respect to the described semantics, no matter what the inputs are. Without further restrictions, this cannot be guaranteed as the constraint domain is not constraint compact. Thus, in a described implementation, relatively simple, purely syntactic restrictions are enforced on assertions and queries.

Definition 4.1. (Assertion safety check 610 (of FIG. 6)): Let A says fact if $fact_1, \ldots, fact_n$, c be an assertion. A variable $x \in Vars(fact)$ is safe iff $x \in Vars(fact_1) \cup \ldots \cup Vars(fact_n)$.

The assertion A says fact if $fact_1, \ldots, fact_n$, c is safe iff
1. if fact is flat, all variables in Vars(fact) are safe; otherwise (i.e., fact is of the form e can $assert_D$ fact') all variables of e are safe, or more specifically, e is either a safe variable or a constant;
2. $Vars(c) \subseteq Vars(fact) \cup Vars(fact_1) \cup \ldots \cup Vars(fact_n)$;
3. $fact_1, \ldots, fact_n$ are flat.

Some examples of safe assertions are:
A says B can read Foo
A says B can read Foo if B can x y
A says B can read Foo if B can x y, x≠y
A says B can x y if B can x y
A says z can x y if z can x Foo, z can read y
A says B can assert x can y z Some examples of unsafe assertions are:
A says B can x Foo
A says z can read Foo if B can x y
A says B can read Foo if B can x y, w≠y
A says B can x y if B can assert C can x y
A says w can assert x can y z The safety condition guarantees that the evaluation of the logic language translation, as described below in section 8, terminates in all cases and is complete. Furthermore, the safety condition enables a simple handling of constraints within the evaluation algorithm of section 8: as long as the query is flat, all variables of a constraint are fully instantiated when conditional predicates are processed, so constraints do not need to be propagated, and there is no need to implement complex constraint solving algorithms.

We now define a safety condition on authorization queries that guarantees that the set of substitutions is finite, given that the assertions of the assertion context is safe. Furthermore, the condition ensures that subqueries of the form not(q) or c will be ground at evaluation time, assuming a left-to-right evaluation rule with propagation for conjunctions, as is defined in section 9.

We first define a deduction relation ⊩ with judgments of the form I ⊩ q: O where q is a query and I, O are sets of variables. Intuitively, the set I represents the variables that are grounded by the context of the query, and O represents the variables that are grounded by the query.

The following deduction relationships provide syntactic checks 612 (of FIG. 6) on authorization queries based on inference rules. If the top is proved, then the bottom may be considered proved as well.

A safe assertion inference rule is:

$$\frac{fact\ is\ flat}{I \Vdash e\ says\ fact:\ Vars(e\ says\ fact) - I}$$

A safe conjunction inference rule is:

$$\frac{I \Vdash q_1: O_1 \quad I \cup O_1 \Vdash q_2: O_2}{I \Vdash q_1, q_2: O_1 \cup O_2}$$

A safe disjunction inference rule is:

$$\frac{I \Vdash q_1: O_1 \quad I \Vdash q_2: O_2}{I \Vdash q_1\ or\ q_2: O_1 \cap O_2}$$

A safe negation inference rule is:

$$\frac{Vars(q) \subseteq I}{I \Vdash \neg q: \emptyset}$$

A safe constraint inference rule is:

$$\frac{Vars(c) \subseteq I}{I \Vdash \neg c: \emptyset}$$

Definition 4.2. (Authorization query safety 612 (of FIG. 6)): An authorization query q is safe iff there exists a set of variables O such that $\emptyset \Vdash q:O$.

Checking safety can be done by recursively traversing all subqueries and thereby constructing the set O (which is always uniquely determined by the query and I).

Examples of safe and unsafe queries are provided in the table below: In the following examples, "," and "or" are left-associative.

| Safe queries | Unsafe queries |
| --- | --- |
| A says C can read Foo | A says B can assert C can read Foo |
| x says y can a b, x = A | x = A, x says y can a b |
| x says y can a b, y says z can a b, x ≠ y | x says y can a b, y says z can a b, x ≠ w |
| x says y can a b or y says x can a b, x ≠ y | x says y can a b or y says z can a b, x ≠ y |
| x says y can a b, not(y says x can a b) | x says y can a b, not( y says z can a b) |

Figure 7:
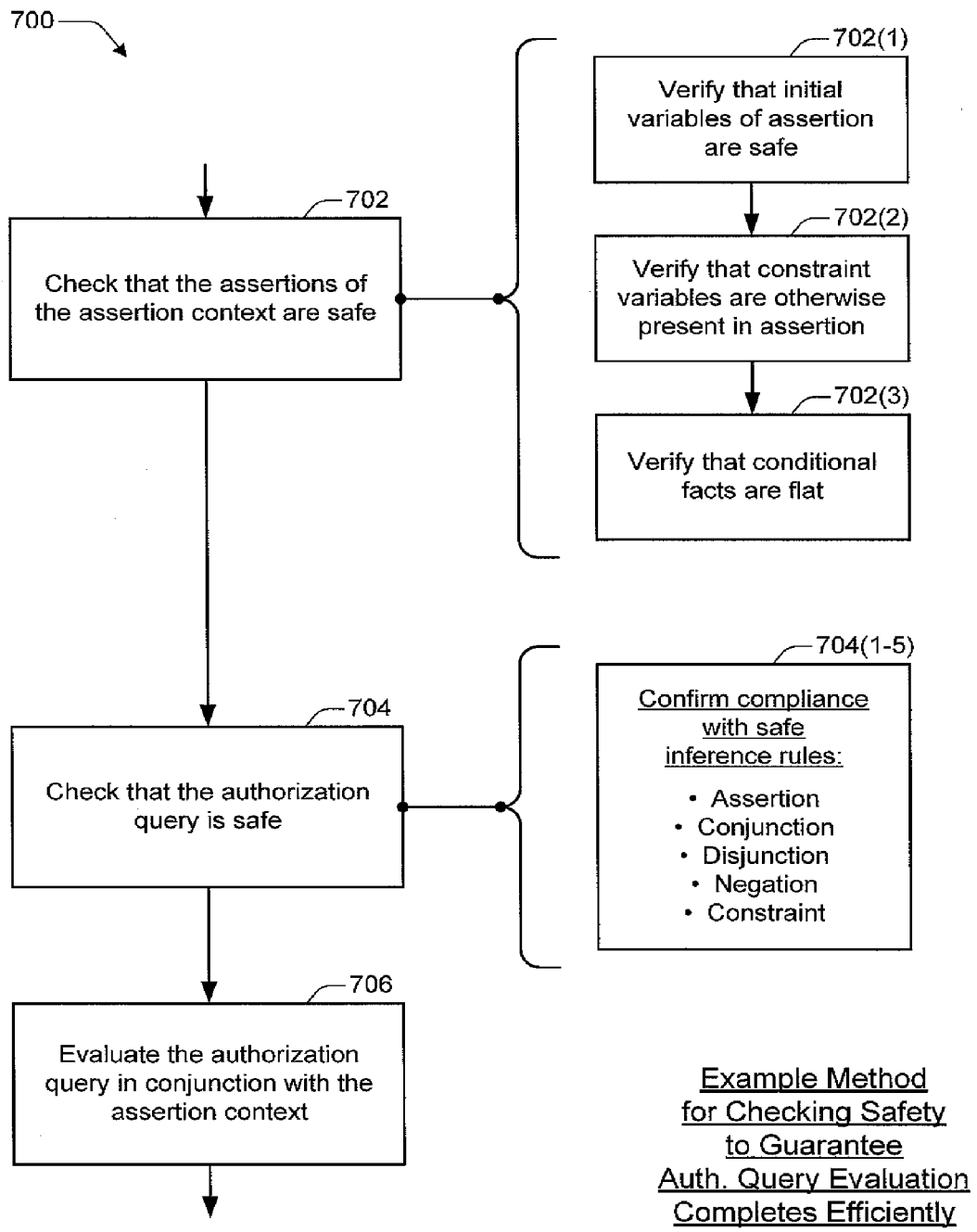
FIG. 7 is a flow diagram that illustrates an example of a method for checking the safety of a security language to guarantee authorization query evaluations complete efficiently.

FIG. 7 is a flow diagram 700 that illustrates an example of a method for checking the safety of a security language to guarantee authorization query evaluations complete efficiently. Flow diagram 700 includes three (3) "primary" blocks 702-706 and four (4) "secondary" blocks 702(1)/(2)/

(3) and 704(1-5). Although the actions of flow diagram 700 may be performed in other environments and with a variety of hardware/software/firmware combinations, some of the features, components, and aspects of FIGS. 1-6 are used to illustrate an example of the method.

In a described implementation, at block 702, the safety of the assertions of the assertion context are checked. For example, definition 4.1 may be applied to each assertion of an assertion context AC. Accordingly, at block 702(1), it is verified that the initial variables of an assertion are safe. For example, part (1) of definition 4.1 may be applied. For instance, the initial variables are the variables of fact (if fact is flat) or the variables of the expression e (if fact is not flat).

At block 702(2), it is verified that any constraint variables are also present somewhere else in the assertion. For example, part (2) of definition 4.1 may be applied. At block 702(3), it is verified that the conditional facts are flat. For example, part (3) of definition 4.1 may be applied.

At block 704, the safety of the authorization query is checked. For example, definition 4.2 may be applied to the authorization query. At block 704(1-5), depending on the syntax of the authorization query, one or more of the safe inference rules is applied to the authorization query to confirm compliance and ensure the query's safety. Example inference rules are: assertion, conjunction, disjunction, negation, and constraint.

If the assertion context fails its check (at block 702) or the authorization query fails its check (at block 704), then the evaluation algorithm may be aborted to avoid attempting to evaluate an assertion context and/or authorization query that will not terminate or that will not be completed. After the safety has been checked successfully (at blocks 702 and 704), then at block 706 the authorization query may be evaluated in conjunction with the assertion context.

5 Assertion Expiration and Revocation

In a described implementation of the security language, expiration dates can be expressed as ordinary verb phrase parameters:

UCambridge says Alice is a student till 31/12/2007 ifcurrentTime( )≤31/12/2007

Sometimes it should be up to the acceptor to specify an expiration date or set its own valid timespan requirements. In this case, the assertion can just contain the date without enforcing it:

UCambridge says Alice is a student till 31/12/2007

An acceptor can then use the date to enforce its own time-based constraints on the validity of the assertion:

Admin says x is entitled to discount if
x is a student till date,
currentTime( )≤date,
date—currentTime( )≤1 year Assertions may have to be revoked before their scheduled expiration date. If the revocation is necessitated due to the compromise of an explicitly trusted issuer's cryptographic key, then revocation is done by informing the relying party that the key should no longer be trusted. The relying party then removes the policy expressing the explicit trust in that key. But it is far more common that an issuer needs to revoke an assertion it has made in the past. This could be due to compromise of the cryptographic key associated with the principal whom the assertion is about, some change in the principal's relationships (e.g., change in employment), or malicious behavior on the part of the principal. For instance, the assertion in the example above has to be revoked if Alice drops out of her university.

We assume that every assertion M is associated with an identifier (e.g., a serial number) $ID_M$. Revocation (and delegation of revocation) can then be expressed in a described implementation by revocation assertions with the verb phrase revokes $ID_M$. For example, the revocation assertion A says A revokes ID if currentTime( )>31/7/2007 revokes all assertions that are issued by A and have identifier ID, but only after 31 Jul. 2007.

Definition 5.1. (revocation assertion): An assertion is a revocation assertion if it is safe and of the form A says A revokes ID if c, or A says $B_1$ can assert$_{D1}$ ... $B_n$ can assert$_{Dn}$ A revokes ID if c.

Given an assertion context AC and a set of revocation assertions $AC_{rev}$ where $AC \cap AC_{rev} = \emptyset$, we remove all assertions revoked by $AC_{rev}$ in AC before an authorization query is evaluated. The filtered assertion context is defined by $$AC - \{M | M \in AC, A \text{ is the issuer of } M, \text{ and } AC_{rev}, \infty | = A \text{ says A revokes } ID_M\}$$

The condition that AC and $AC_{rev}$ are disjoint means that revocation assertions cannot be revoked (at least not within a described implementation of the security language). Allowing revocation assertions to be revoked by each other causes the same problems and semantic ambiguities as negated body predicates in logic programming. Although these problems could be formally overcome, for example by only allowing stratifiable revocation sets or by computing the well-founded model, these approaches are not simple enough to encourage their use in commercial systems.

6 Introduction to Security Language Translations with Logic Resolution

An example implementation of a security language as described herein above provides a mechanism for expressing security policies in a highly human-understandable form. Moreover, the security language can be checked for safety. However, security policies also need to be evaluated to make authorization decisions.

To that end, existing logic languages can be leveraged. There are existing logic languages that have been developed over time and are thoroughly tested. There are also helpful tools that may be used with these logic languages. An example applicable logic language is Datalog, and specifically constrained Datalog. However, other logic languages may alternatively be utilized.

Techniques and mechanisms are described herein to enable such existing logic languages to be used with a security language. The security language may be translated into a logic language, as described in section 7. Section 8 describes an evaluation algorithm with tabling that is performed in the logic language. The evaluation algorithm can produce a proof graph in the logic language. In section 9, a technique is described for translating the proof graph reflecting the logic language into a proof graph reflecting the security language. Hence, the authorization process, including the evaluation algorithm, may be analyzed in terms of the security language.

7 Translation into a Logic Language

Example assertion semantics for a described security language is defined by the three deduction rules of section 2. This semantics is more comprehensible and intuitive than one defined in terms of a translation into some form of formal logic, which has been proposed. Nevertheless, it is useful to be able to efficiently translate security language assertion contexts into equivalent logic language programs. We can then leverage known complexity results (e.g., polynomial data complexity) and use the translated logic language program for query evaluation, which is described in section 8.

We now describe an algorithm for translating a safe assertion context into an equivalent logic language program. By way of example only, the safe assertion context is translated into a constrained Datalog program. In the following, we treat expressions of the form $e_1$ says$_k$ fact as Datalog predicates, where k is either a variable or 0 or ∞. This can be seen as a sugared notation for a predicate where the predicate name is the string concatenation of all infix operators (says, can assert, alias, revokes, and predicate names) occurring in the expression, including subscripts for can assert. The arguments of the predicate are the collected expressions between these infix operators. For example, the expression A says$_k$ x can assert$_\infty$ y can assert$_0$ B alias z is shorthand for says_can_assert_infinity_can_assert_zero_alias(A, k, x, y, B, z).

Algorithm 7.1. The translation of an assertion context AC proceeds as follows:

1. If fact$_0$ is flat, then an assertion
A says fact$_0$ if fact$_1$, . . . , fact$_n$, c
is translated into the rule
A says$_k$ fact$_0$:—A says$_k$ fact$_1$, . . . , A says$_k$ fact$_n$, c
where k is a fresh variable.
2. Otherwise, fact$_0$ is of the form
$e_0$ can assert$_{K0}$ . . . $e_{n-1}$ can assert$_{Kn-1}$ fact,
for some n≥1, where fact is flat.
Let fâct$_n$ ≡ fact and fâct$_i$ ≡ $e_i$ can assert$_{Ki}$ fâct$_{i+1}$,
for i ∈ {0 . . . n−1}. Note that fact$_0$ = fâct$_0$. Then the assertion
A says fact$_0$ if fact$_1$, . . . , fact$_m$, c
is translated into a set of n+1 Datalog rules as follows.
(a) We add the Datalog rule
A says$_k$ fâct$_0$:—A says$_k$ fact$_1$, . . . , A says$_k$ fact$_m$, c
where k is a fresh variable.
(b) For each i ∈ {1 . . . n}, we add a Datalog rule
A says$_\infty$ fâct$_i$:—
   x says$_{Ki-1}$ fât$_i$,
   A says$_\infty$ x can assert$_{Ki-1}$ fâct$_i$
where x is a fresh variable.
3. Finally, for each Datalog rule created above of the form
A says$_k$ e verbphrase:— . . .
we add a rule
A says$_k$ x verbphrase:—
   A says$_k$ x alias e,
   A says$_k$ e verbphrase
where x is a fresh variable. Note that k is not a fresh variable, but either a constant or a variable taken from the original rule.

Figure 8:
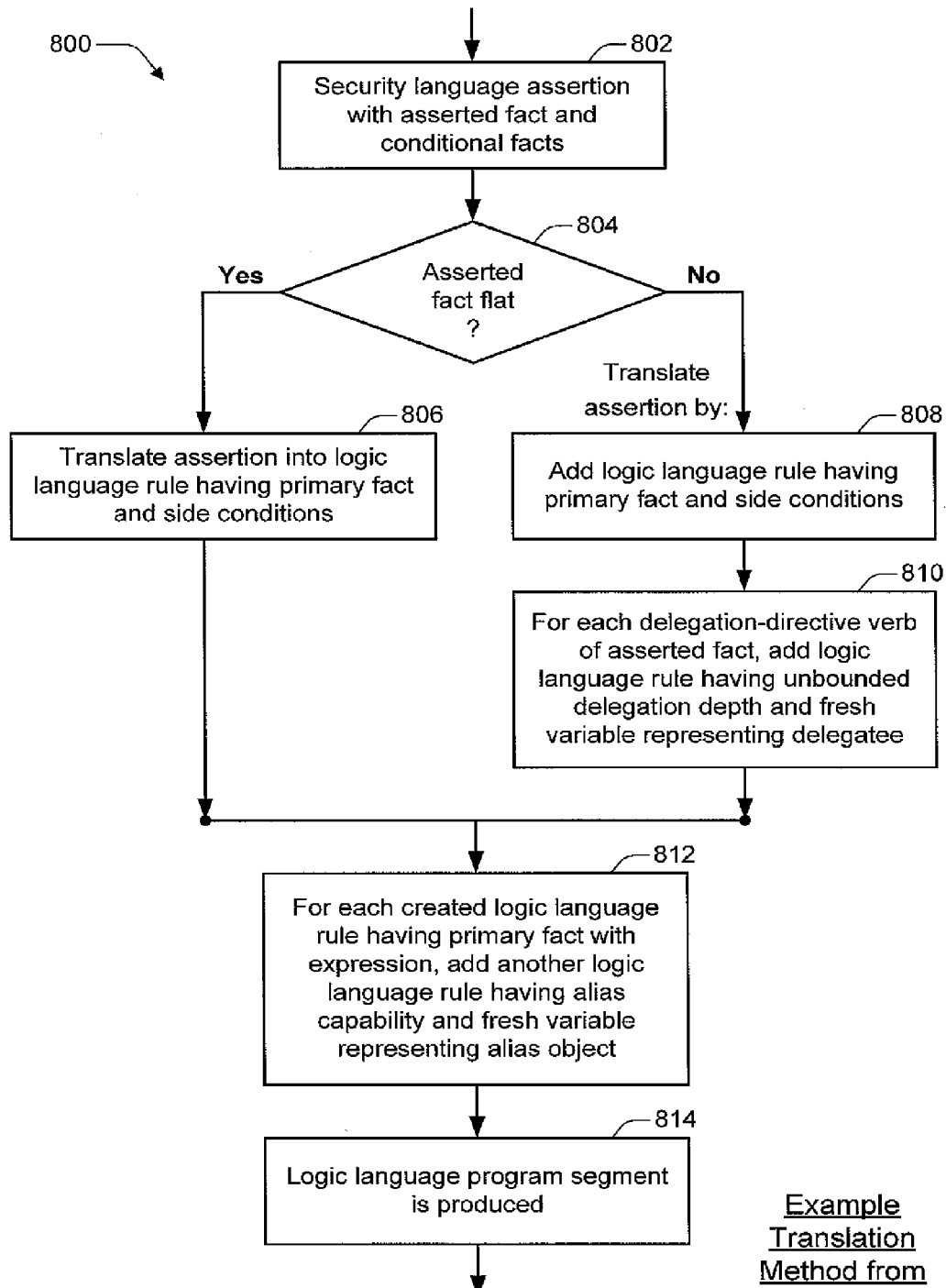
FIG. 8 is a flow diagram that illustrates an example of a method for translating a security language to a logic language.

FIG. 8 is a flow diagram 800 that illustrates an example of a method for translating a security language into a logic language. Flow diagram 800 includes seven (7) blocks 802-814. Although the actions of flow diagram 800 may be performed in other environments and with a variety of hardware/software/firmware combinations, some of the features, components, and aspects of FIGS. 1-6 are used to illustrate an example of the method. Flow diagram 800 at least partially represents Algorithm 7.1 above.

In a described implementation, at block 802, a security language assertion with an asserted fact and zero or more conditional facts is extracted from an assertion context. At block 804, it is determined whether the asserted fact is flat. If so, then at block 806 the assertion is translated into a logic language rule having a primary fact and zero or more side conditions. For example, part 1 of Algorithm 7.1 may be performed. The primary fact corresponds to the asserted fact, and the side conditions correspond to the conditional facts. These differing terms are used for the sake of clarity to textually differentiate parts of the logic language program from parts of the security language assertion context.

If, on the other hand, the asserted fact is not determined (at block 804) to be flat, then the security assertion is translated by blocks 808 and 810. If the fact is not flat, then the assertion is a delegation assertion with at least one delegation-directive verb (e.g., can assert, can say, etc.).

At block 808, a logic language rule having a primary fact and zero or more side conditions is added (e.g., to a growing logic language program). For example, part 2 (a) of Algorithm 7.1 may be performed. At block 810, for each delegation-directive verb of the asserted fact of the security language assertion, a logic language rule having an unbounded delegation depth and a fresh variable representing the delegatee is added. More specifically, the fresh variable represents the principal to whom rights are being delegated. For example, part 2 (b) of Algorithm 7.1 may be performed.

At block 812, for each logic language rule having an asserted fact with an expression that has been created (at block 806 or 808/810), another logic language rule having an alias capability and a fresh variable representing the object of the alias is added to the logic language program. For example, part 3 of Algorithm 7.1 may be performed. At block 814, a logic language program segment corresponding to the input assertion of the security language assertion context is thereby produced. The actions of flow diagram 800 are repeated for each assertion in a given assertion context.

An example translation of an assertion is as follows:
A says B can assert$_\infty$ y can assert$_0$ C can read z if y can read Foo is translated into
   A says$_k$ B can assert$_\infty$ y can assert$_0$ C can read z:—A says$_k$ y can read Foo
   A says$_\infty$ y can assert$_0$ C can read z:—
   x says$_\infty$ y can assert$_0$ C can read z,
   A says$_\infty$ x can assert$_\infty$ y can assert$_0$ C can read z
   A says$_\infty$ C can read z:—
   x says$_0$ C can read z,
   A says$_\infty$ x can assert$_0$ C can read z
in Steps 2a and 2b.
Finally, in Step 3, the following rules are also added:
   A says$_k$ x can assert$_\infty$ can assert$_0$ C can read z:—
   A says$_k$ x alias B,
   A says$_k$ B can assert$_\infty$ can assert$_0$ C can read z
   A says$_\infty$ x can assert$_0$ C can read z:—
   A says$_k$ x alias y
   A says$_\infty$ y can assert$_0$ C can read z
   A says$_\infty$ x can read z:—
   A says$_k$ x alias C,
   A says$_\infty$ C can read z Definition 7.2. (Consequence operator): The immediate consequence operator $T_P$ is a function between sets of ground predicates and is defined as:

$$T_P(I) = \{P | (P':-P_1, \ldots, P_n, c) \in P,$$
$$P'\theta = P,$$
$$P_i\theta \in I,$$
$$c\theta \text{ is valid}$$
$$\text{Vars}(c\theta) = \text{Vars}(P) = \emptyset\}$$

The operator $T_P$ is monotonic and continuous, and its least fixed point $T_P^W(\emptyset)$ contains all ground facts deducible from P.

Theorem 7.3. (Soundness and completeness): Let P be the Datalog translation of the assertion context AC. A says$_D$ fact ∈ $T_P^W(\emptyset)$ iff AC, D |= A says fact.

8 Logic Language Evaluation with Tabling

In the section above, we show how a set of safe security language assertions can be translated into an equivalent, at least partially safe, constrained Datalog program. In the context of deductive databases, the bottom-up approach is most often used for Datalog evaluation. There, the program's model, or its least fixed-point (which is finite, due to safety), is computed once and for all. This has the advantage that it is a complete, terminating procedure, and query evaluation is fast once the fixed-point has been constructed.

However, bottom-up evaluation is not as suitable for a described implementation of the security language because the assertion context is not constant. In fact, it may be completely different between different requests. Computing the model for every request is not efficient as it results in the evaluation of irrelevant goals. Furthermore, the queries we are interested in are usually fully or partially instantiated; thus, a top-down, goal-directed approach seems more appropriate.

The most widely-known top-down evaluation algorithm is SLD resolution as is used in Prolog. Unfortunately, SLD resolution can run into infinite loops even for safe Datalog programs, if some of the predicates have recursive definitions. The problem remains even if instead of a depth-first a breadth-first search strategy is employed: the looping occurs because the SLD search tree is infinite. Tabling, or memoing, is an approach to guarantee termination by incorporating some bottom-up techniques into a top-down resolution strategy. The basic idea is to prune infinite search trees by keeping a table of encountered subgoals and their answers, and to compute a subgoal only if it is not already in the table.

We describe here a deterministic algorithm based on tabling and apply it to security language assertions that have been translated into a logic language program. Two global tables are kept during the evaluation process.

Figure 9:
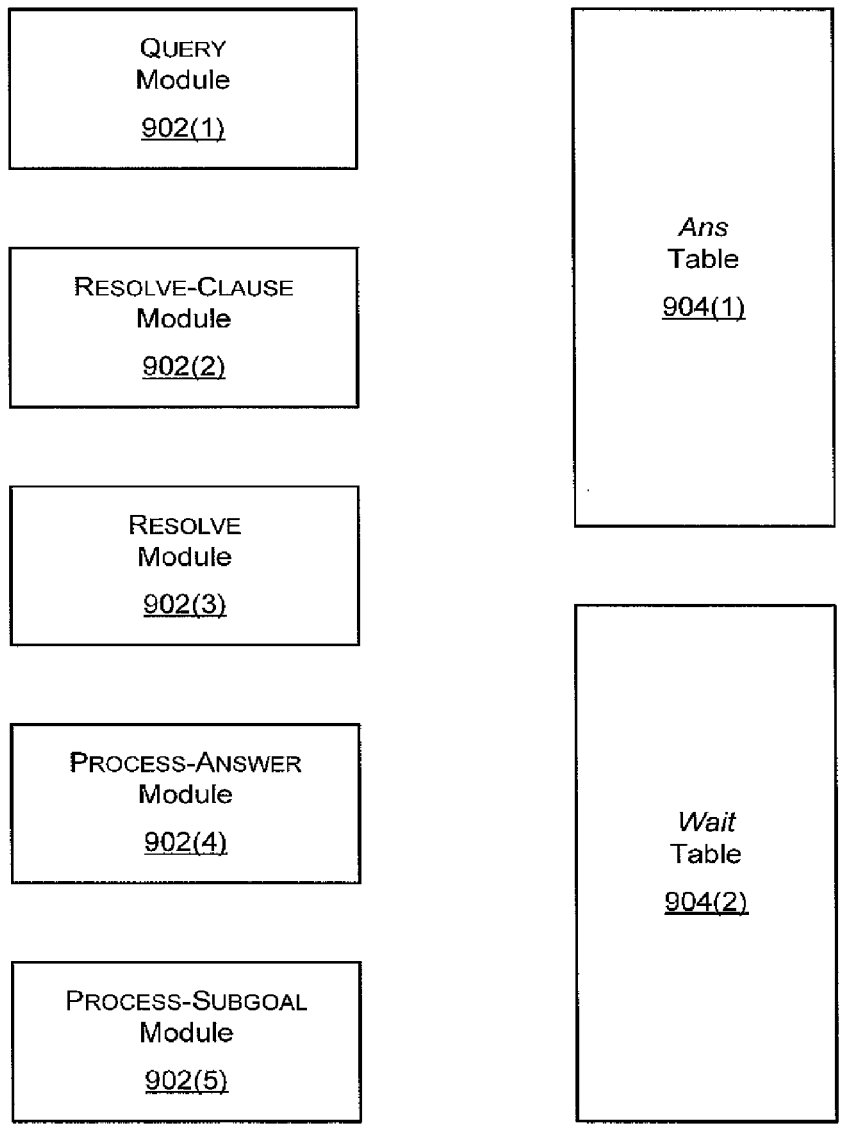
FIG. 9 is a block diagram illustrating an example deterministic evaluation algorithm with tabling.

FIG. 9 is a block diagram illustrating an example deterministic evaluation algorithm with tabling 900. Evaluation algorithm 900 includes five modules 902: a QUERY module 902(1), a RESOLVE-CLAUSE module 902(2), a RESOLVE module 902(3), a PROCESS-ANSWER module 902(4), and a PROCESS-SUBGOAL module 902(5). Evaluation algorithm 900 also includes two tables 904: an Ans table 904(1) and a Wait table 904(2).

The first table, Ans table 904(1), maps predicates to sets of ground predicates. If a subgoal P (uninstantiated or partially or fully instantiated) is computed, P is added to the domain of Ans, and at any point in time, Ans(P) returns the set of answers to P (these are ground instances of P) that have been found so far. At the end of the evaluation process, Ans will contain the complete answers to all encountered subgoals including the root goal.

The second table is Wait table 904(2). It maps predicates P to subgoals of the form <P;$P_0$:—$\vec{P}$,c; S> and a predicate $P_0^1$. The subgoal can be interpreted as follows: P is the top-level predicate of the proof tree; $P_0$ is the predicate to be solved next; $\vec{P}$ is the list of predicates that have to be solved after $P_0$; c is a constraint on the predicate variables; and S is an instance of P that keeps track of the instantiations found so far by being continuously narrowed down.

A number of terms and concepts that relate to the evaluation algorithm are defined and/or explained below.

Definition 8.1. A substitution $\rho$ is more general than $\theta$ iff there exists a substitution $\theta'$ such that $\theta = \rho\theta'$.

Definition 8.2. Let P and Q be two predicates. A substitution $\theta$ is a unifier of P and Q iff $P\theta = Q\theta$. A substitution $\theta$ is a most general unifier of P and Q iff it is more general than any other unifier of P and Q.

Definition 8.3. A variable renaming for a predicate P is a substitution $\theta$ such that $\theta$ defines a permutation on the set of variables occurring in P.

If two predicates P and Q are unifiable, they also have a most general unifier that is unique up to variable renaming.

We denote it by Mgu(P,Q). Finding the most general unifier is relatively simple, but there are more intricate algorithms that run in linear time.

Additional terms and concepts are defined and/or explained below:

Definition 8.4. Let P and Q be two predicates. Then P is an instance of Q iff $P = Q\theta$ for some substitution $\theta$. We also say that P is subsumed by Q and write P=>Q Proposition 8.5. P=>Q iff there exists a most general unifier $\theta$ of P and Q, and $\theta$ is a variable renaming of P.

The following pseudocode provides an example of an evaluation algorithm. It is explained further below.

```
QUERY(P)
1    Wait(P) := ∅;
2    RESOLVE-CLAUSE(P);
3    return Ans(P)
RESOLVE-CLAUSE(P)
1    Ans(P) := ∅;
2    let P' = Fresh(P) in
3        foreach (P₀ :- P⃗, c) ∈ P do
4            RESOLVE(< P;P₀ :- - P⃗,c;P' >,P')
RESOLVE(< P;P₀ :- P⃗,c;P' >,P₀')
1    if θ = Mgu(P₀, P₀') exists and d = Simplify (cθ) is satisfiable then
2        if P⃗ = [ ] then PROCESS- ANSWER(P, Sθ)
3        else match P⃗ with [P₁,..., Pₙ] in
4            PROCESS-SUBGOAL(< P; P₁θ :- P₂θ,..., Pₙθ, d; S θ >)
PROCESS- ANSWER(P, S)
1    if S ∉ Ans(P) then
2        Ans(P) := Ans(P) ∪ {S};
3        foreach subgoal ∈ Wait(P) do
4            RESOLVE (subgoal,S)
PROCESS-SUBGOAL(subgoal)
1    match subgoal with < P; P₀ :- P⃗, c;S > in
2        if there exists P₀' ∈ Dom(Ans) such that P₀ ⇒ P₀'
3            Wait (P₀') := Wait(P₀') ∪ {subgoal};
4            foreach T ∈ Ans(P₀¹) do
5                RESOLVE(subgoal, T)
6        else
7            Wait(P₀) := {subgoal};
8            RESOLVE-CLAUSE(P₀)
```

To find the answers to a predicate P with respect to a set of rules $\mathcal{R}$ and with initially empty Ans and Wait tables (i.e., Dom(Ans)=Dom(Wait)=∅), call the routine QUERY(P).

Each of the five modules 902 is described below:

QUERY (module 902(1)) spawns a new proof tree by calling RESOLVE-CLAUSE(P). After the call Ans(P) will be populated with the correct and complete answers.

RESOLVE-CLAUSE (module 902(2)) resolves each rule in $\mathcal{R}$ against Fresh(P) by calling RESOLVE. The function Fresh (P) renames all variables in P to fresh ones that do not occur anywhere in $\mathcal{R}$.

RESOLVE (module 902(3)) takes as parameters a subgoal of the form <P;$P_0$:—$\vec{P}$, c; S> and a predicate $P'_0$. The Simplify function in RESOLVE may perform any kind of equivalence-preserving simplifications on a constraint (erg. (False, c)=False). At the very least, it should simplify ground constraints to true or false. It is safe to over-approximate the satisfiability check on line 1, i.e., "false" should only be returned if $c\theta$ really is unsatisfiable, but "true" may be returned even in the case if $c\theta$ is unsatisfiable, as long as Simplify ($c\theta$) is not fully instantiated. A simple implementation of the approximate satisfiability check could thus return "true" whenever the simplified constraint is not yet fully instantiated.

If the unification and the satisfiability check succeed, there are two subcases. Either the list $\vec{P}$ is empty, in which case we know that Sθ is an answer to P, and moreover, it is a ground answer, due to safety. PROCESS-ANSWER is then called to further process the answer. Otherwise, we employ a left-to-right evaluation strategy by picking the first predicate in the list as the next one to be solved, and call PROCESS-SUBGOAL with the substitution θ pushed into all the parameters but the first. The first parameter, P, remains unchanged since it is used for keeping track of what the original goal was. The preliminary solution S is narrowed down to Sθ.

PROCESS-ANSWER (module 902(4)) takes an answer to P and updates Ans table 904(1). Wait table 904(2) contains all the suspended subgoals that are waiting for this answer. Each suspended subgoal is resumed by calling RESOLVE together with the newly found answer.

PROCESS-SUBGOAL (module 902(5)) takes as argument a subgoal with $P_0$ as the next predicate to solve, and checks if there already is an existing subgoal $P'_0$ in Ans table 904(1) that subsumes it. If there is, $P'_0$'S existing answers can be reused (by calling RESOLVE), so there is no need to start a new proof tree for $P_0$. Additionally, a copy of the subgoal is added to the Wait entry for $P'_0$ so that any future answers to $P'_0$ will be used as well. Only if no entry in Ans table 904(1) subsumes $P_0$ a new proof tree is spawned by a call to RESOLVE-CLAUSE. Prior to that, an entry for $P_0$ containing the subgoal is created in Wait table 904(2).

Additional definitions and theorems are described below:

Definition 8.6. Answers $\mathcal{R}$ (P) is defined as the return value of the call QUERY(P) in the context of a set of equality-free rules $\mathcal{R}$ and initially empty Ans and Wait tables 904, if the call terminates. Otherwise, Answers $\mathcal{R}$ (P) is undefined.

Theorem 8.7. (termination): Answers $\mathcal{R}$ (P) is defined and finite for all partially safe queries P.

Theorem 8.8. (soundness and completeness): Let P be a partially safe query. Answers $\mathcal{R}$ (P) is equal to the set of all ground instances of P that are in $T_P^W(\emptyset)$.

Figure 10:
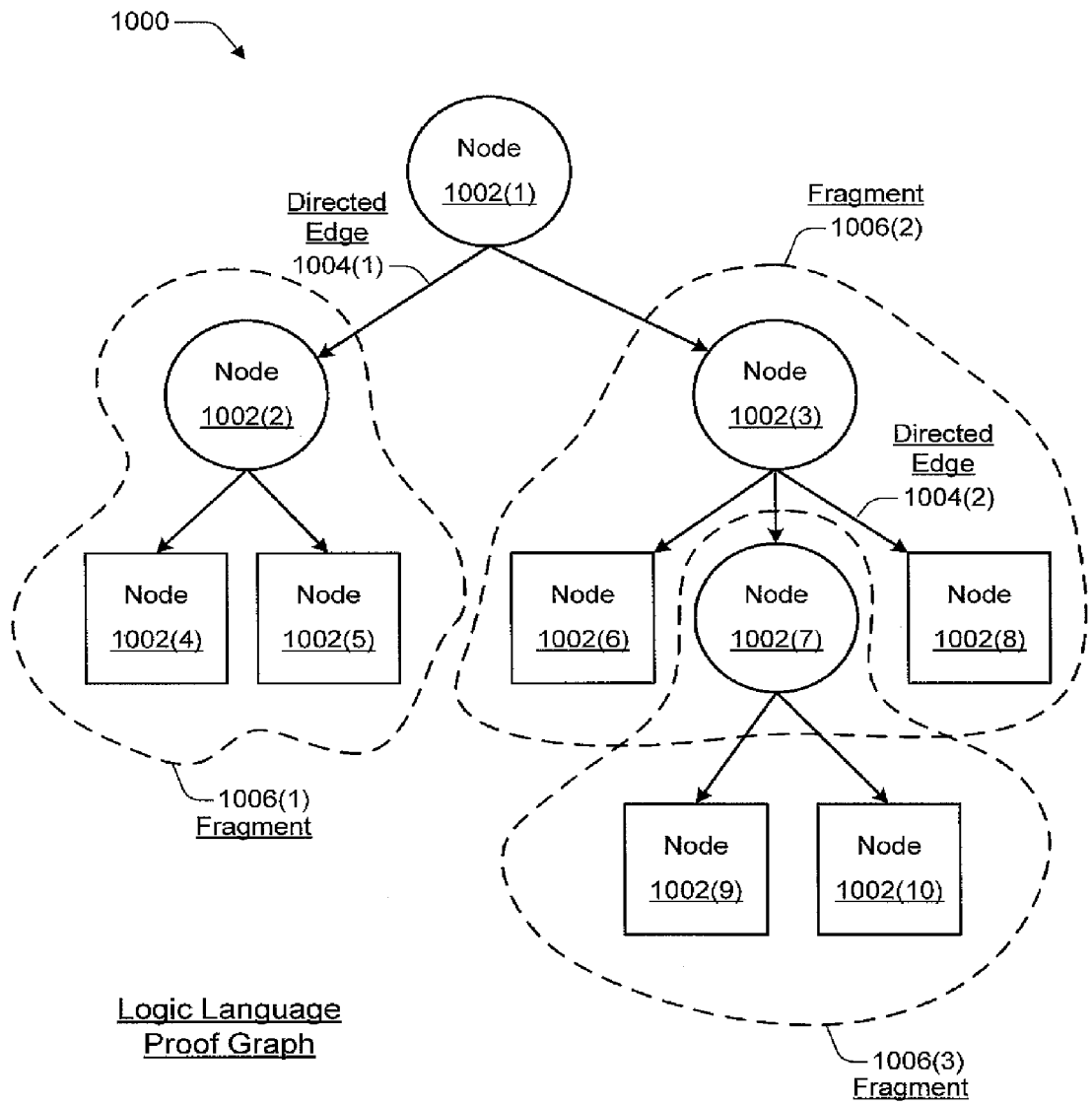
FIG. 10 is a block diagram of an example logic language proof graph that is produced during an evaluation algorithm and that includes graph fragments.

FIG. 10 is a block diagram of an example logic language proof graph 1000 that is produced during an evaluation algorithm and that includes graph fragments 1006. As illustrated, logic language proof graph 1000 includes multiple nodes 1002 and multiple directed edges 1004. Specifically, logic language proof graph 1000 includes 10 nodes 1002(1 . . . 10). However, a logic language proof graph 1000 may include any number of nodes 1002 and any number of directed edges 1004. Two directed edges 1004(1) and 1004(2) are explicitly labeled. Directed edges 1004 indicate logical deductions between nodes 1002.

When testing and troubleshooting security policies, it may be useful to be able to see a justification of an authorization decision. This can be a visual and/or textual representation of the corresponding proof graph constructed according to the semantics rule system in section 2 above. The proof graph produced during an evaluation may also be archived for auditing purposes.

Leaf nodes of logic language proof graph 1000 are represented by rectangular nodes 1002(4), 1002(5), 1002(6), 1002(8), 1002(9), and 1002(10). Non-leaf nodes are represented by circular nodes 1002(1), 1002(2), 1002(3), and 1002(7). The circles are nodes that prove side conditions (e.g., body predicates). The rectangular leaf nodes of logic language proof graph 1000 are rules translated from assertions from the original assertion context. The other nodes are derived statements, which are taken from the answers table (e.g., Ans table 904(1)) if the deterministic tabling algorithm described above is employed in the evaluation.

Logic language proof graph 1000 is separated into example fragments 1006. Specifically, three fragments 1006(1, 2, 3) are shown, but a proof graph may be separated into any number of fragments 1006. Each fragment 1006 forms part of a structure of the overall proof graph. Consequently, each fragment 1006 includes node(s) 1002 and directed edge(s) 1004.

In order for analysis, troubleshooting, and/or auditing, etc. to be performed by someone familiar with the security language, logic language proof graph 1000 may be translated into a corresponding security language proof graph (not separately shown in whole). To effect the translation, a pattern matching process is performed. A logic language fragment 1006 is matched to a corresponding security language fragment.

In a described implementation, the sample security language fragments that may be used in the pattern matching process are each respectively associated with a semantics rule from the security language. Example fragment correspondences between logic language fragments and security language fragments are described below with reference to FIGS. 12A, 12B, 13A, 13B, 14A, and 14B.

In a described specific example implementation, the algorithm presented above with reference to FIG. 9 can be modified to construct a Datalog proof graph during query evaluation. A proof graph is a directed acyclic graph. For each answer to a query, there is a root node in the graph. Every non-leaf node is a ground Datalog predicate of the form A says$_D$ fact and has as child nodes the Datalog rule, the instantiated conditional facts, and the instantiated constraint. Leaf nodes are either Datalog rules in AC or ground constraints that are valid. Examples are shown as the left panels of FIGS. 12A, 13A, and 14A.)

If during an execution of the Algorithm 7.1 from above, each generated Datalog rule is labeled with the algorithm step at which it was generated (i.e., 1, 2(a), 2(b), or 3), the Datalog proof graph contains sufficient information to be converted into a corresponding security logic proof graph.

Figure 11:
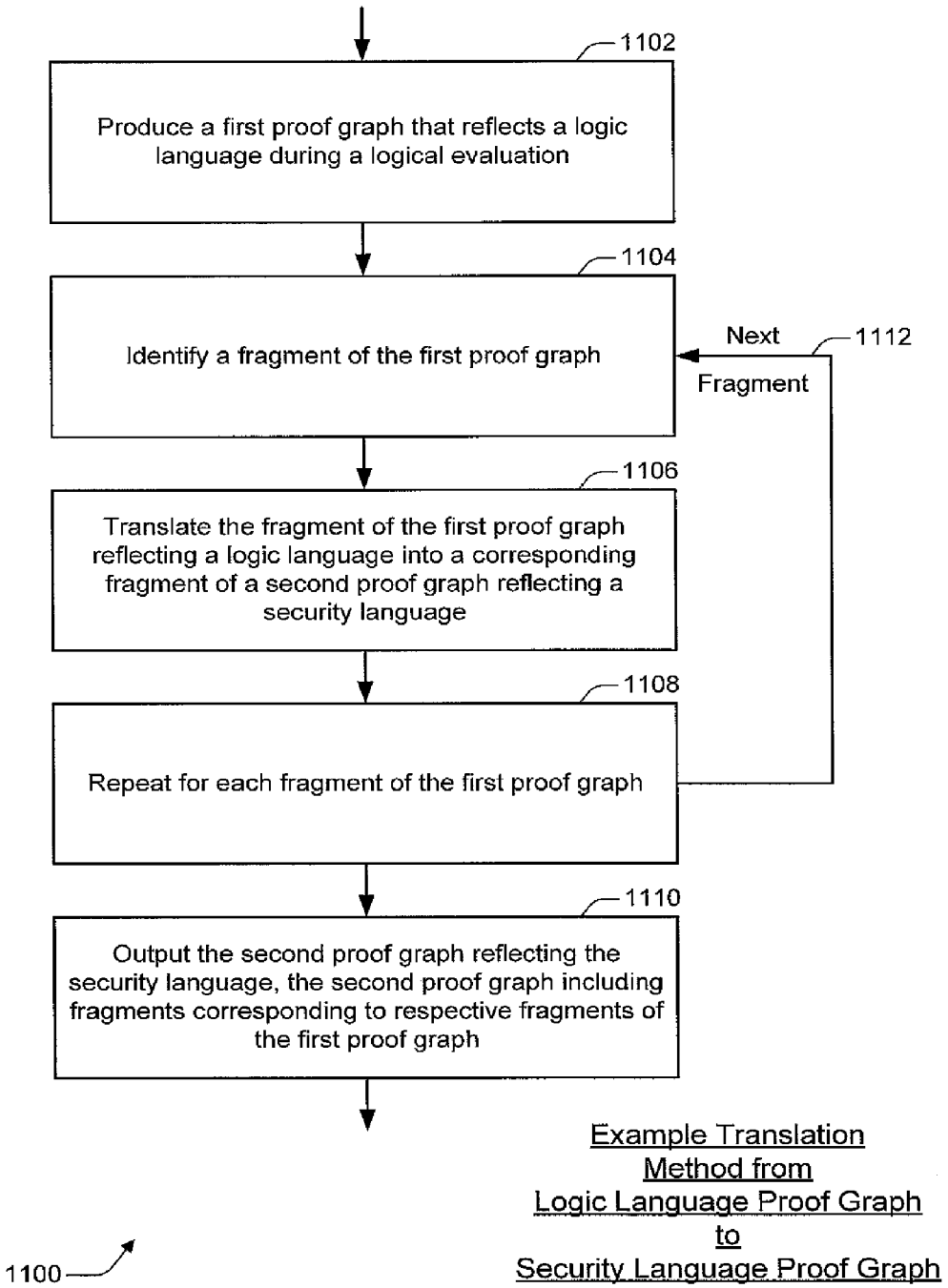
FIG. 11 is a flow diagram that illustrates an example of a method for translating a logic language proof graph to a security language proof graph.

FIG. 11 is a flow diagram 1100 that illustrates an example of a method for translating a logic language proof graph to a security language proof graph. Flow diagram 1100 includes five (5) blocks 1102-1110. Although the actions of flow diagram 1100 may be performed in other environments and with a variety of hardware/software/firmware combinations, some of the features, components, and aspects of FIGS. 1-10 are used to illustrate an example of the method.

In a described implementation, at block 1102, a first proof graph that reflects a logic language during a logical evaluation is produced. For example, a logic language proof graph 1000 may be produced during a logical evaluation. The logical evaluation is effected on a logical language program that is derived from a security language assertion context via a translation.

At block 1104, a fragment of the first proof graph is identified. For example, a fragment 1006 of logic language proof graph 1000 may be identified.

At block 1106, the fragment of the first proof graph reflecting a logic language is translated into a corresponding fragment of a second proof graph reflecting a security language. For example, fragment 1006 of logic language proof graph 1000 that reflects a logical language (e.g., Datalog, etc.) is translated into a corresponding fragment of a second proof graph that reflects a security language (e.g., a policy assertion security language). For instance, a logic language pattern of the fragment of the first proof graph may be matched to a corresponding security language pattern selected from multiple possible security language patterns. These security language patterns may, for example, be associated with semantics rules of the security language.

At block 1108, the identification of a fragment and the translation thereof is repeated for each fragment of the first proof graph. For example, as indicated by next fragment arrow 1112, another fragment 1006 of logic language proof graph 1000 may be identified and translated into a corresponding fragment of a security language proof graph.

At block 1110, the second proof graph reflecting the security language is output once the logic language proof graph has been traversed and translated. The second proof graph includes fragments corresponding to respective fragments of the first proof graph. This second proof graph reflecting the security language can also be archived and/or audited.

Figure 12A:
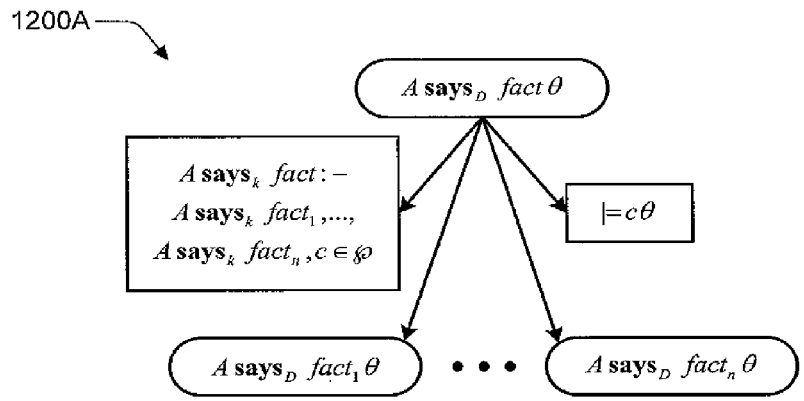
FIGS. 12A and 12B are block diagrams of example proof fragments for a logic language and a corresponding security language, respectively, for a conditional semantics rule.
Figure 12B:
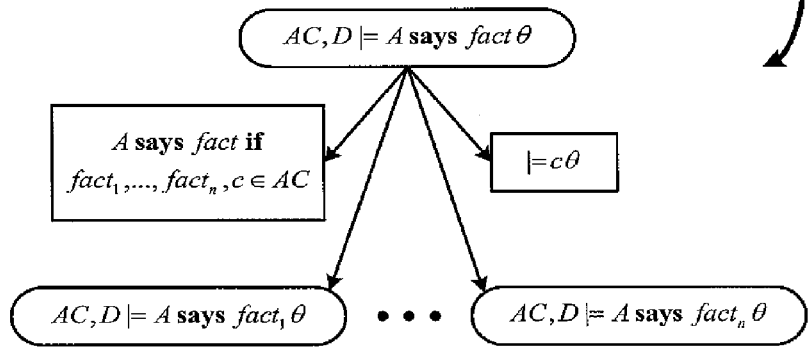

FIGS. 12A and 12B are block diagrams of example proof fragments for a logic language and a corresponding security language, respectively, for a conditional semantics rule. The security language proof graph fragment sample 1200B for the conditional semantics rule is shown at FIG. 12B. The corresponding logic language proof graph (e.g., proof node with parent) fragment 1200A that may exist in a proof graph produced during an evaluation is shown at FIG. 12A. The oval nodes represent proved side conditions, and the rectangular nodes represent rules or constraints. These graph fragments 1200 relate to translation steps 1 or 2(a) of Algorithm 7.1.

Figure 13A:
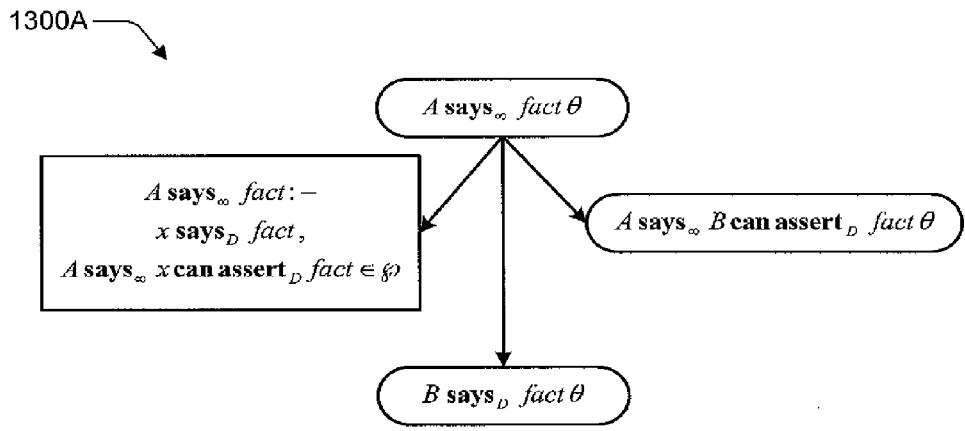
FIGS. 13A and 13B are block diagrams of example proof fragments for a logic language and a corresponding security language, respectively, for a delegation semantics rule.
Figure 13B:
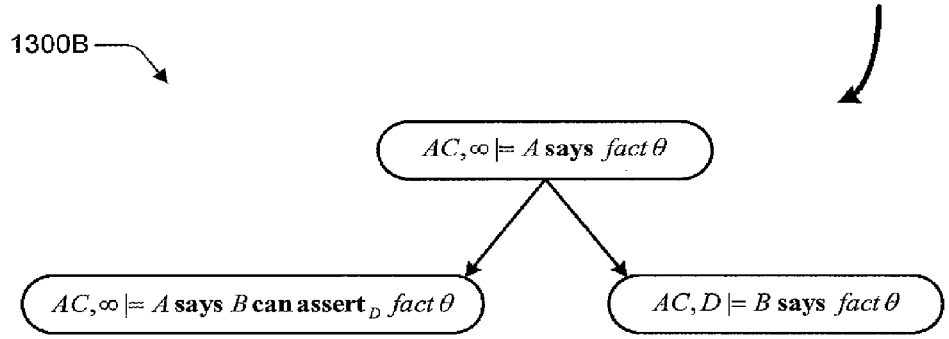

FIGS. 13A and 13B are block diagrams of example proof fragments for a logic language and a corresponding security language, respectively, for a delegation semantics rule. The security language fragment sample 1300B for the delegation semantics rule is shown at FIG. 13B. The corresponding logic language fragment 1300A that may exist in a proof graph produced during an evaluation is shown at FIG. 13A. These graph fragments 1300 relate to translation step 2(b).

Figure 14A:
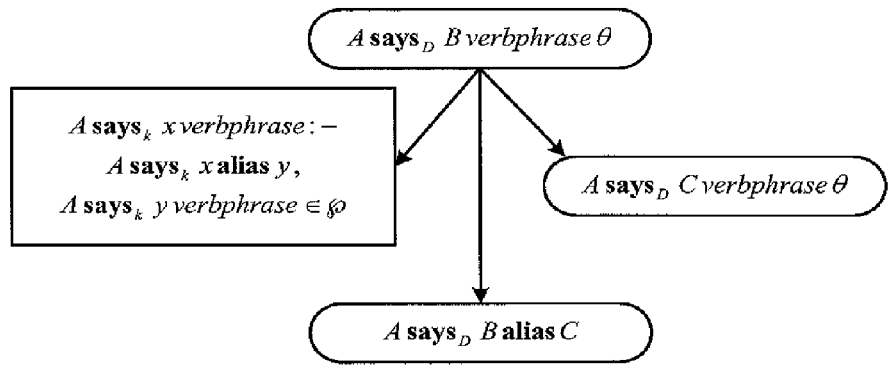
FIGS. 14A and 14B are block diagrams of example proof fragments for a logic language and a corresponding security language, respectively, for an alias semantics rule.
Figure 14B:
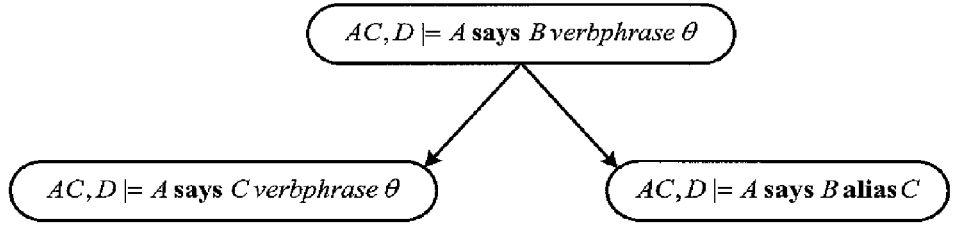

FIGS. 14A and 14B are block diagrams of example proof fragments for a logic language and a corresponding security language, respectively, for an alias semantics rule. The security language fragment sample 1400B for the alias semantics rule is shown at FIG. 14B. The corresponding logic language fragment 1400A that may exist in a proof graph produced during an evaluation is shown at FIG. 14A. These graph fragments 1400 relate to translation step 3.

9 Evaluation of Authorization Queries

Based on the algorithm from the previous section, we can now describe how to evaluate complex authorization queries as defined in section 3. In the following, let AC be an assertion context and P its Datalog translation, and let $\epsilon$ be the empty substitution. We define the function $AuthAns_{AC}$ on authorization queries as follows.

$$
\begin{aligned}
AuthAns_{AC}(e \text{ says fact}) &= \{\theta \mid P \in Answers_P(e \text{ says}_\infty \text{ fact}) \text{ and } \theta = Mgu(e \text{ says}_\infty \text{ fact}, P)\} \\
AuthAns_{AC}(q_1, q_2) &= \{\theta_1\theta_2 \mid \theta_1 \in AuthAns_{AC}(q_1) \text{ and } \theta_2 \in AuthAns_{AC}(q_2 \theta_1)\} \\
AuthAns_{AC}(q_1 \text{ or } q_2) &= AuthAns_{AC}(q_2) \cup AuthAns_{AC}(q_2) \\
AuthAns_{AC}(\text{notq}) &= \begin{cases} \{\epsilon\} & \text{if Vars}(q)= \emptyset \text{ and } AuthAns_{AC}(q)= \emptyset \\ \emptyset & \text{if Vars}(q)= \emptyset \text{ and } AuthAns_{AC}(q) \neq \emptyset \\ \text{undefined} & \text{otherwise} \end{cases} \\
AuthAns_{AC}(c) &= \begin{cases} \{\epsilon\} & \text{if } |=c \\ \emptyset & \text{if Vars}(c)= \emptyset \text{ and } |\neq c \\ \text{undefined} & \text{otherwise} \end{cases}
\end{aligned}
$$

The following theorem shows that $AuthAns_{AC}$ is an algorithm for evaluating safe authorization queries.

Theorem 9.1. (Finiteness, soundness, and completeness of authorization query evaluation): For all safe assertion contexts AC and safe authorization queries q, 1. $AuthAns_{AC}(q)$ is defined and finite, and
2. AC, $\theta \vdash$ q iff $\theta \in AuthAns_{AC}(q)$.

The devices, action, aspects, features, functions, procedures, modules, data, structures, protocols, components, etc. of FIGS. 1-14B are illustrated in diagrams that are divided into multiple blocks. However, the order, interconnection, interrelationships, layout, etc. in which FIGS. 1-14B are described and/or shown are not intended to be construed as a limitation, and any number of the blocks can be modified, combined, rearranged, augmented, omitted, etc. in any manner to implement one or more systems, methods, devices, procedures, media, apparatuses, APIs, protocols, arrangements, etc. for security language translations with logic resolution.

Although system, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A computer-implemented method comprising:
   under control of one or more processors configured with executable instructions:
   determining whether an asserted fact included in a security language assertion is flat based on whether the asserted fact is nested;
   upon determining that the asserted fact is not flat,
     determining that the security language assertion is a delegation assertion with at least one delegation-directive verb, and
     translating the security language assertion into a plurality of logic language rules, the translating comprising:
       adding a first logic language rule including a primary fact corresponding to the asserted fact; and
       for each delegation-directive verb of the at least one delegation-directive verb, adding a second logic language rule having an unbounded delegation depth and a fresh variable representing a delegatee, wherein the fresh variable represents a principal to whom rights are being delegated;
       for each logic language rule having an asserted fact with an expression that has been created when adding the first logic language rule and/or the second logic language rule, adding a third language rule having an alias capability and a fresh variable representing an object of an alias;
   determining whether another asserted fact of another security language assertion is flat;
   upon determining that the other asserted fact is not flat, translating the other security language assertion into a fourth logic language rule including another primary fact corresponding to the other asserted fact;
   combining the first, second, third and fourth logic language rules into a logic language program; and
   evaluating the logic language program in conjunction with an authorization query.

2. The computer-implemented method as recited in claim 1, wherein the evaluating comprises:
   producing a proof graph that reflects the logic language program; and
   translating the proof graph that reflects the logic language program into another proof graph that reflects the security language assertion and the other security language assertion using fragment samples that establish respective correspondences between logic language fragments and security language fragments based on semantics rules of a security language.

3. The computer-implemented method as recited in claim 1, wherein the evaluating comprises:
applying a deterministic algorithm based on tabling that utilizes a first table mapping predicates to sets of ground predicates and a second table mapping predicates to subgoals.

4. A system comprising:
one or more processors;
one or more computer-readable storage media storing executable instructions that, when executed by the one or more processors, cause the one or more processors to perform acts comprising:
determining whether an asserted fact included in a security language assertion is flat based on whether the asserted fact is nested; and
upon determining that the asserted fact is not flat,
determining that the security language assertion is a delegation assertion with at least one delegation-directive verb, and translating the security language assertion, the translating comprising: adding a first logic language rule including a primary fact corresponding to the asserted fact, and
for each delegation-directive verb of the at least one delegation-directive verb, adding a second logic language rule having an unbounded delegation depth and a fresh variable representing a delegatee, wherein the fresh variable represents a principal to whom rights are being delegated;
for each logic language rule having an asserted fact with an expression that has been created when adding the first logic language rule and/or the second logic language rule, adding a third language rule having an alias capability and a fresh variable representing an object of an alias;
determining whether another asserted fact of another security language assertion that the other asserted fact is flat;
upon determining that the other asserted fact is not flat, translating the other security language assertion into a fourth logic language rule including another primary fact corresponding to the other asserted fact;
combining the first, second, third and fourth logic language rules into a logic language program; and
evaluating the logic language program in conjunction with an authorization query.

5. The system of claim 4, the acts further comprising:
producing a proof graph that reflects the logic language program; and
translating the proof graph that reflects the logic language program into another proof graph that reflects the security language assertion and the other security language assertion using fragment samples that establish respective correspondences between logic language fragments and security language fragments based on semantics rules of a security language.

6. The system of claim 4, the acts further comprising:
applying a deterministic algorithm based on tabling that utilizes a first table mapping predicates to sets of ground predicates and a second table mapping predicates to subgoals.

\* \* \* \* \*